United States Patent
Bono et al.

(10) Patent No.: US 10,983,964 B1
(45) Date of Patent: Apr. 20, 2021

(54) MANAGING FILE SYSTEM TAILORED FOR CLUSTER DEPLOYMENT

(71) Applicant: EMC IP Holding Company LLC, Hopkinton, MA (US)

(72) Inventors: Jean-Pierre Bono, Westborough, MA (US); Marc DeSouter, Wayne, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 320 days.

(21) Appl. No.: 15/664,993

(22) Filed: Jul. 31, 2017

(51) Int. Cl.
| | |
|---|---|
| *G06F 16/182* | (2019.01) |
| *G06F 3/06* | (2006.01) |
| *G06F 16/17* | (2019.01) |

(52) U.S. Cl.
CPC ........ *G06F 16/1827* (2019.01); *G06F 3/0604* (2013.01); *G06F 3/067* (2013.01); *G06F 3/0631* (2013.01); *G06F 3/0659* (2013.01); *G06F 16/1727* (2019.01)

(58) Field of Classification Search
CPC .. G06F 16/1827; G06F 16/1727; G06F 3/067; G06F 3/0659; G06F 3/0631; G06F 3/0604
See application file for complete search history.

(56) References Cited

U.S. PATENT DOCUMENTS

| | | | |
|---|---|---|---|
| 7,203,713 B2 | 4/2007 | Faiman et al. | |
| 7,383,463 B2 | 6/2008 | Hayden et al. | |
| 7,600,083 B2 | 10/2009 | Aggarwal et al. | |
| 7,603,532 B2 | 10/2009 | Rajan et al. | |
| 7,631,155 B1 | 12/2009 | Bono et al. | |
| 7,769,722 B1 | 8/2010 | Bergant et al. | |
| 7,865,677 B1 * | 1/2011 | Duprey | G06F 3/0604 711/162 |
| 7,873,619 B1 * | 1/2011 | Faibish | G06F 16/13 707/705 |
| 7,873,700 B2 | 1/2011 | Pawlowski et al. | |
| 8,578,124 B2 | 11/2013 | Root et al. | |
| 8,996,837 B1 | 3/2015 | Bono et al. | |
| 9,009,121 B2 | 4/2015 | Wickremesinghe et al. | |
| 9,122,689 B1 | 9/2015 | Bono et al. | |

(Continued)

OTHER PUBLICATIONS

Brian Ward. How Linux Works, 2nd Edition [online]. No Starch Press. Nov. 2014 [retrieved on Jun. 24, 2020]. Retrieved from the Internet:< URL: https://learning.oreilly.com/library/view/how-linux-works/9781457185519/> Chapters 1,3, 4, ISBN: 9781593275679. (Year: 2014).*

(Continued)

*Primary Examiner* — James E Richardson
(74) *Attorney, Agent, or Firm* — BainwoodHuang

(57) ABSTRACT

A technique for operating a file system in a NAS (network attached storage) cluster includes discovering, by a data node running in the NAS cluster, a LUN (Logical UNit) provisioned from block storage. The data node renders the LUN as a block device and creates a local volume, built on the block device. The data node then deploys the file system on the local volume. The file system, the local volume, the block device, and the LUN all have address spaces, and the address space of each corresponds one-to-one with the address space of each of the others. Write requests directed to addresses in the file system propagate to the LUN, where they effect writes at corresponding addresses in the LUN.

14 Claims, 22 Drawing Sheets

(56) References Cited

U.S. PATENT DOCUMENTS

| | | | |
|---|---|---|---|
| 9,146,853 | B2 | 9/2015 | Garson et al. |
| 9,280,555 | B1 | 3/2016 | Bono et al. |
| 9,304,999 | B1 | 4/2016 | Bono et al. |
| 9,305,009 | B1 | 4/2016 | Bono et al. |
| 9,305,071 | B1 | 4/2016 | Bono et al. |
| 9,355,121 | B1 | 5/2016 | Scheer et al. |
| 9,372,870 | B1* | 6/2016 | Levy .................. H04L 67/1097 |
| 9,378,219 | B1 | 6/2016 | Bono et al. |
| 9,424,117 | B1 | 8/2016 | Bono et al. |
| 9,507,787 | B1 | 11/2016 | Bono et al. |
| 9,519,510 | B2 | 12/2016 | Strauss et al. |
| 9,535,630 | B1 | 1/2017 | Bono et al. |
| 9,778,865 | B1 | 10/2017 | Srinivasan et al. |
| 9,830,082 | B1 | 11/2017 | Srinivasan et al. |
| 10,430,298 | B2 | 10/2019 | Zwilling et al. |
| 2005/0273858 | A1* | 12/2005 | Zadok ..................... G06F 21/50 726/24 |
| 2012/0036309 | A1* | 2/2012 | Dillow .................. G06F 3/0688 711/103 |
| 2013/0055249 | A1* | 2/2013 | Vaghani ................ G06F 3/0617 718/1 |
| 2014/0244929 | A1* | 8/2014 | Acharya ............... G06F 3/0605 711/114 |
| 2019/0114782 | A1* | 4/2019 | Yamakawa .......... G11B 27/031 |

OTHER PUBLICATIONS

Setting up Logical Volumes with LVM [online], Alpine Linux. Nov. 4, 2015 [retrieved on Jun. 25, 2020] [archived at archive.org on Jun. 28, 2016]. Retrieved from the Internet:< URL: https://web.archive.org/web/20160628180912/https://wiki.alpinelinux.org/wiki/Setting_up_Logical_Volumes_with_LVM>. (Year: 2015).*

Bigang et al. Design and Implementation of a Storage Virtualization System Based on SCSI Target Simulator in SAN. Feb. 2005. Tsinghua Science& Technology. vol. 10, Issue 1. pp. 122-127 (Year: 2005).*

Derek Vadala. Managing RAID on Linux [online], Dec. 2002 [retrieved on Jun. 25, 2020]. O'Reilly Media, Inc. Retrieved from the Internet < URL: https://learning.oreilly.com/library/view/managing-raid-on/9780596802035/>. Chapter 'md Block Special Files'. ISBN: 9781565927308) (Year: 2002).*

"Ubuntu Manpage: io—Asynchronous IO". Archived at archive.org on Mar. 10, 2017 [Retrieved on Oct. 15, 2020], Retrieved from the Internet:< URL: https://web.archive.org/web/20170310004426/http://manpages.ubuntu.com/manpages/precise/man3/io.3.html (Year: 2017).*

Onxnz. "Linux Asynchronous I/O". Oct. 13, 2016 [Retrieved on Oct. 15, 2020]. TechStack. Retrieved from the Internet:< URL: https://oxnz.github.io/2016/10/13/linux-aio/ (Year: 2016).*

"Configuring NFS on VNX™," EMC® VNX™ Series, Release 7.1, EMC Corporation, 1998, 150 pages.

"Configuring Virtual Data Movers on VNX™," EMC® VNX™ Series, Release 7.0, EMC Corporation, 1998, 80 pages.

Bono, et al., "Unified Datapath Processing With Virtualized Storage Processors," U.S. Appl. No. 13/828,294, filed Mar. 14, 2013.

Bono et al, "File System Provisioning and Management With Reduced Storage Communication," U.S. Appl. No. 15/664,980, filed Jul. 31, 2017.

* cited by examiner

File System Database 152 (Per NAS Server 150)

For Each User File System in this NAS Server 150
- File System Name
- Export FSID
- Internal FSID
- File System State (e.g., Mounted, Unmounted)
- Dev-ID of File System
- Mount Point Name and Options for File System
- Max Provisioned Capacity of File System
- Nature of File File System (e.g., Production, Snapshot, Migration)

*FIG. 7*

Management Database 162 (On Cluster Manager 160)

For Each Tenant
- Tenant Name
- Tenant UUID
- ID of each NAS Node Exclusively Owned
- ID of each NAS Node Shared For Each NAS Server 150
- Tenant UUID
- NAS Node ID
- NAS Server Name
- NAS Server UUID
- State (e.g., Normal, Destination, or Offline)
- Unique Dev-ID and LUN for Root FS
- Unique Dev-ID and LUN for Config FS
- Unique Dev-ID and LUN for each user file system (including snapshots)

*FIG. 8*

MANAGING FILE SYSTEM TAILORED FOR CLUSTER DEPLOYMENT

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems support NAS (network attached storage) implementations in which storage processors receive host storage requests directed to particular file systems. Storage requests may arrive in accordance with file-based protocols, such as CIFS (Common Internet File System), SMB (Server Message Block), and/or an NFS (Network File System). Such data storage systems organize their data in file systems, which store host data in files and directories. The file systems closely coordinate with underlying block-based storage to provide storage provisioning and other features.

SUMMARY

Unfortunately, conventional file systems are not well optimized for cluster deployments, particularly for NAS (network attached storage) clusters having many NAS data nodes. Conventional file systems tightly coordinate with underlying block storage. Unfortunately, such coordination can be difficult to manage across large numbers of data nodes and across different block storage technologies. For example, it may be desirable to support a variety of block storage solutions, which may range from block-based arrays to cloud-based storage and may support software defined storage. What is needed is a file system that is capable of being deployed across many nodes in a cluster and across a variety of block storage solutions.

In contrast with conventional file systems, an improved technique for operating a file system in a NAS (network attached storage) cluster includes discovering, by a data node running in the NAS cluster, a LUN (Logical UNit) provisioned from block storage. The data node renders the LUN as a block device and creates a local volume, built on the block device. The data node then deploys the file system on the local volume. The file system, the local volume, the block device, and the LUN all have address spaces, and the address space of each corresponds one-to-one with the address space of each of the others. Write requests directed to addresses in the file system propagate to the local volume, to the block device, and to the LUN, where they effect writes at corresponding addresses in the LUN.

Advantageously, file systems constructed in accordance with the improved technique can be deployed across arbitrarily large numbers of data nodes and with a variety of block storage technologies.

Certain embodiments are directed to a method of operating a file system. The method includes discovering, by a data node running in a NAS (network attached storage) cluster, a LUN (Logical UNit) provisioned from block storage to the data node. The method further includes rendering a block device built on the LUN and creating a local volume built on the block device. The LUN, the block device, and the local volume each have an address space. The method further includes deploying a file system on the local volume, the file system having an address space in which each address corresponds one-to-one with a respective address in the local volume, with a respective address in the block device, and with a respective address in the LUN. The method still further includes receiving a write request to write a set of data to the file system, the write request resolving to a mapped address in the file system, and propagating the write request from the file system to the local volume, to the block device, and to the LUN, whereupon the block storage is directed to write the set of data at an address of the LUN that corresponds to the mapped address in the file system.

Other embodiments are directed to a computerized apparatus constructed and arranged to perform a method of operating a file system, such as the method described above. Still other embodiments are directed to a computer program product. The computer program product includes a set of non-transient, computer-readable media that store instructions which, when executed by control circuitry of a computerized apparatus cluster, cause the control circuitry cluster to perform a method of operating a file system, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 7 shows an example FSDB (file system database) of a NAS server in additional detail.

FIG. 8 shows an example management database of a cluster manager of FIG. 1 in additional detail.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

This document is provided in the following sections to assist the reader:
   Section I presents an example system environment and NAS (network attached storage) cluster in which embodiments of improved techniques hereof can be practiced.
   Section II presents techniques for realizing and operating a file system that provides optimizations for NAS clusters, such as the one presented in Section I.
Section I: Example Environment and NAS Cluster.

An improved technique for managing data storage provides multiple physical computing machines and block storage arranged in a NAS (network attached storage) cluster. The physical computing machines run NAS servers, with each NAS server including an FSDB (file system database) that identifies a set of file systems that belong to the NAS server. Providing FSDBs on a per-NAS-server basis promotes mobility of NAS servers as well as scalability of the NAS cluster overall.

This section presents a novel platform for realizing a NAS cluster, which employs any number of NAS data nodes and one or more management nodes having access to shared block storage. Each node of the cluster runs a software library to support NAS cluster operations within an operating system, such as Linux. Example implementations of the NAS cluster leverage software-defined features, such as software defined storage (SDS), and may be deployed over a wide range of operating platforms, such as ESX (VM-ware), KVM (kernel-base virtual machine), bare metal, or containers (e.g., Docker containers).

Figure 1:
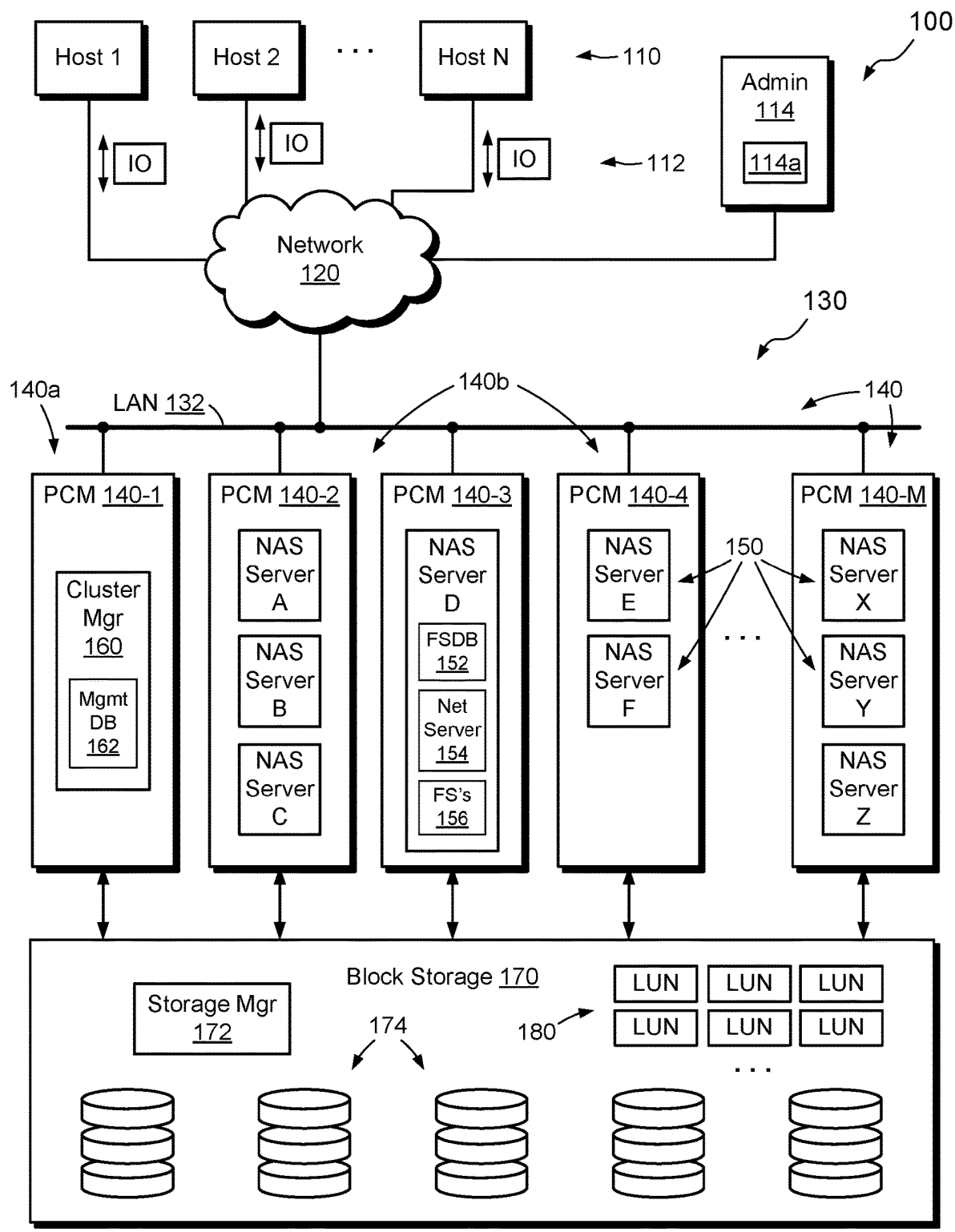
FIG. 1 is a block diagram of an example electronic environment and NAS (network attached storage) cluster in which embodiments of the improved technique hereof can be practiced.

FIG. 1 shows an example environment 100 in which embodiments of the improved technique hereof can be practiced. Here, multiple host computing devices ("hosts") 110 access a NAS cluster 130 over a network 120. The NAS cluster 130 includes multiple physical computing machines 140 (e.g., 140-1 through 140-M) connected to one another via a computer network, such as a LAN (local area network) 132. Each of the physical computing machines 140 has access to block storage 170, which includes multiple storage drives 174, such as magnetic disk drives, electronic flash drives, NVM-e drives, and/or other types of drives. The block storage 170 includes a storage manager 172, which manages block-based functions, such as provisioning, snapping, replication, and so forth, as well as communication with external equipment. In some examples, the storage manager 172 arranges the storage drives 174 in RAID (Redundant Array of Independent Disks) groups or in other redundant arrangements, and expresses the storage drives 174 as Logical Units (LUNs) 180. Each LUN 180 may be constructed from any number of storage drives 174, from portions of such storage drives 174, or from a single portion of a single storage drive 174. As is known, clients may access data in LUNs by specifying logical unit number and offset.

The environment 100 further includes an administrative machine 114, such as a computer, which runs an administrative program 114a for managing the NAS cluster 130. In some examples, the administrative program 114a and the storage manager 172 are provided together in a single program or set of programs. Thus, in some examples, the storage manager 172 manages not only the block storage 170 but also the NAS cluster 130.

The physical computing machines 140 may be provided as circuit board assemblies, or "blades," which plug into a chassis (or multiple chassis) that encloses and cools them. Each chassis has a backplane for interconnecting the physical computing machines 140, and additional connections may be made among physical computing machines using cables. It is understood that no particular hardware configuration is required, however, as the physical computing machines 140 may be any type of computing devices capable of processing host I/O requests.

The hosts 110 may be any computing device or devices that access the NAS cluster 130 for reading and/or writing data stored therein. Examples of hosts 110 include personal computers, smart phones, tablet computers, Internet of Things (IoT) devices, workstations, enterprise servers, or any other type or types of processing device capable of exchanging data over a network. The network 120 can itself be any type of computer network, such as the Internet, a WAN (wide area network), a LAN, or any other type of network or combination of networks. In some examples, the network 120 and the LAN 132 are provided as a single network.

The block storage 170 may be implemented in a variety of ways. In one example, a VMAX array, Storage Center array, XtremIO array, or some other type of block-based array provides the block storage 170 (VMAX, Storage Center, and XtremIO are available from Dell EMC). In such arrangements, each of the physical computing machines 140 may connect to the block storage 170 directly, via a SAN (storage area network), or in some other manner. In other examples, the block storage 170 may be provided using cloud-based storage, such as Amazon Web Services (e.g., EC2 or EBS), Microsoft Azure, and Google Cloud, using VSAN (virtual storage area network), or using SDS, such as ScaleIO, which turns direct-attached storage into shared block storage. Using ScaleIO, the physical computing machines 140 may include direct-attached storage, which ScaleIO virtualizes and makes available for use across the NAS cluster 130. In some examples, the NAS cluster 130 renders the block storage 170, regardless of its source, as SDS, e.g., by abstracting APIs (application programming interfaces) for platform management, provisioning, and advanced data services. Different types of storage technology may be combined in any suitable way. For example, the block storage 170 may include a combination of XtremIO storage and cloud-based storage.

As further shown in FIG. 1, the physical computing machines 140 may be configured as either cluster manager nodes 140*a* or as NAS data nodes 140*b*. In the example shown, which is not intended to be limiting, each physical computing machine 140 serves only one role, either as a cluster manager node or as a NAS data node, and there is only one cluster manager node for the entire NAS cluster 130. As shown, physical computing machine 140-1 is configured as a cluster manager node and includes a cluster manager 170. The cluster manager 160 includes a management database 162, which contains information about the NAS cluster 130 and information about the various NAS data nodes. In an example, the cluster manager 160 acts as a single entry point for control and management of the NAS cluster 130.

As further shown, physical computing machines 140-2 through 140-M are configured as NAS data nodes 140*b*. The NAS data nodes 140*b* host NAS servers 150. FIG. 1 shows several NAS servers 150 (A-F and X-Z), with NAS Server D shown in additional detail and intended to be representative of all NAS servers 150. Each NAS server 150 includes a file system database (FSDB) 152, a set of network servers 154 (e.g., one or more CIFS, SMB, and/or NFS servers), and a set of file systems 156 that belong to the NAS server 150. The FSDB 152 provides information about each of the set of file systems 156, and the network server(s) 154 enable network access to the set of file systems 156 by hosts 110.

The set of file systems 156 may include production file systems as well as snapshots. In a particular example, each file system is backed by a respective LUN 180 in the block storage 170, i.e., there is a one-to-one relationship between file systems and LUNs. In an example, each file system belongs to one and only one NAS server 150. These are working assumptions but should not be regarded as limiting. A NAS data node may operate any number of NAS servers 150, and each NAS server 150 may include any number of file systems.

NAS servers 150 are not generally themselves implemented as virtual machines or even virtualized userspace containers, although they may be deployed within such structures. Rather, NAS servers 150 are preferably lightweight structures, with many NAS servers 150 capable of operating within a single execution environment on a physical computing machine 140. Owing to their lightweight nature, NAS servers 150 can be quickly moved from one physical computing machine to another with little or no disruption to hosts 110.

Although the NAS cluster 130 appears to be deployed from a single location, this is merely an example. Alternatively, the NAS cluster 130 may be deployed across multiple locations.

In example operation, hosts 110 issue I/O requests 112 directed to particular file systems within the NAS cluster 130. Network servers 154 operating within NAS data nodes 140*b* receive the I/O requests 112, and the respective physical computing machines process the I/O requests 112 to effect reads and/or writes of specified data. Specified data may include particular files, directories, or portions thereof within specified file systems.

One should appreciate that the NAS data nodes 140*b* act as vehicles for moving data between hosts 110 and block storage 170 but do not persistently store the file systems themselves. Rather, block storage 170 provides persistent storage of the file systems of all of the NAS servers 150, e.g., with data of each file system stored in a respective LUN 180.

The pictured arrangement promotes mobility of NAS servers 150 among NAS data nodes 140*b*. For example, the cluster manager 160 orchestrates provisioning, failover, and load balancing of NAS servers 150 across NAS data nodes in an efficient manner that avoids bottlenecks. By providing an FSDB 152 with each NAS server 150, each NAS server 150 is realized as a highly self-contained structure, as it does not rely on access to any centralized database for most information about its contents. Movement of a NAS server 150 from a first NAS data node to a second NAS data node is predominantly a matter of disabling a network server 154 on the first NAS data node, starting a network server on the second NAS data node, accessing the FSDB 152 of the NAS server to identify the file systems that it contains, and connecting to the LUNs 180 in block storage 170 that provide backing store for those file systems. The self-contained nature of the NAS servers 150 also promotes scalability as it enables thousands of NAS servers to be managed by a single cluster manager 160.

Figure 2:
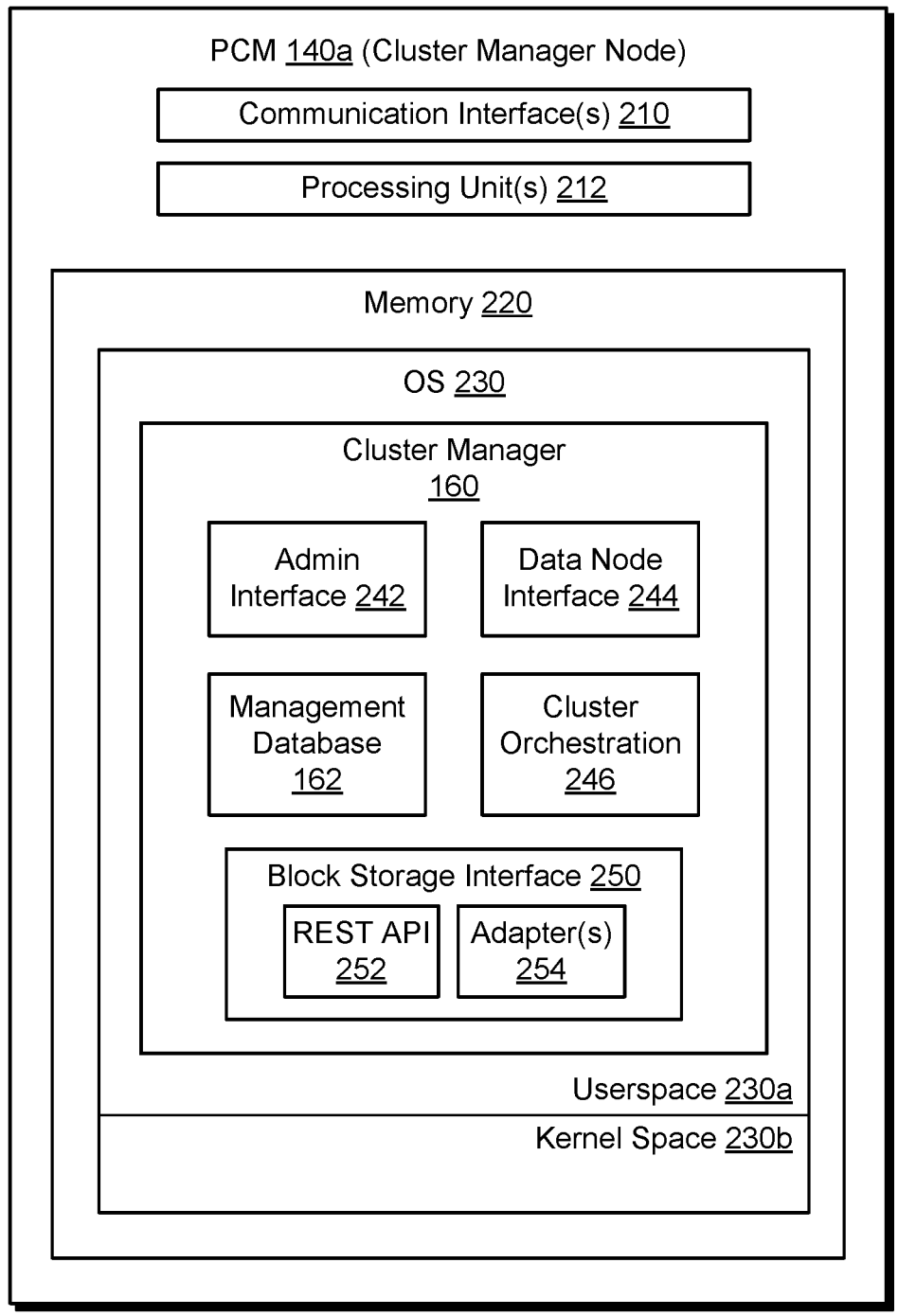
FIG. 2 is a block diagram of an example physical computing machine of the NAS cluster of FIG. 1 configured as a cluster manager.

FIG. 2 shows an example implementation of a physical computing machine configured as a NAS cluster manager node 140*a*. Physical computing machine 140*a* is intended to be representative of physical computing machine 140-1 in FIG. 1, as well as any additional cluster manager nodes. For example, some implementations may employ multiple cluster manager nodes for redundancy or locality.

Cluster manager node 140*a* includes one or more communication interfaces 210, a set of processing units 212, and memory 220. The communication interfaces 210 include, for example, network interface adapters for converting electronic and/or optical signals received over the network 120 to electronic form for use by the cluster manager node 140*a*. The set of processing units 212 includes one or more processing chips and/or assemblies. In a particular example, the set of processing units 212 includes numerous multi-core CPUs. The memory 220 includes both volatile memory (e.g., RAM), and non-volatile memory, such as one or more ROMs, disk drives, solid state drives, and the like. The set of processing units 212 and the memory 220 together form control circuitry, which is constructed and arranged to carry out various methods and functions as described herein. The memory 220 includes a variety of software constructs realized in the form of executable instructions. When the executable instructions are run by the set of processing units 212, the set of processing units 212 is caused to carry out the operations of the software constructs. Although certain software constructs are specifically shown and described, it is understood that the memory 220 typically includes many other software constructs, which are not shown, such as various applications, processes, and daemons.

As further shown in FIG. 2, the memory 220 "includes," i.e., realizes by execution of software instructions, an operating system (OS) 230, which includes userspace 230*a* and kernel space 230*b*. The cluster manager 160 (FIG. 1) runs within userspace 230*a* and includes the following software constructs:

Administrative Interface 242. An interface for communicating with administrative program 114*a*, which may be implemented stand-alone or within storage manager 172 (FIG. 1). For example, administrative program 114*a* presents a graphical user interface (GUI) that enables administrators to query the NAS cluster 130, establish settings, provision NAS servers 150, create file systems, perform load balancing, take snapshots, start replication sessions, and/or perform other administrative activities.

Data Node Interface 244. Interface to NAS data nodes 140*b* in the NAS cluster 130. May use TCP/IP (transmission control protocol/Internet protocol) or some other suitable protocol for communicating over LAN 132.

Management Database 162. The above-described database for storing information about the NAS cluster 130 and information about the various NAS data nodes.

Cluster orchestration 246. Manages procedures involving data services within and between NAS data nodes.

Block Storage Interface 250. Control interface to block storage 170. May include REST (representational state transfer) interface 252 and one or more adapters 254. REST interface 252 provides a generalized control interface that applies across different makes and/or models of block storage 170. Adapter(s) 254 are specific to particular makes and/or models, and map REST instructions to corresponding control instructions in a native control vocabulary of the block storage 170. In some examples, adapter 254 is provided in storage manager 172 rather than in cluster manager 160. For example, adapter 254 may be installed as a storage manager plug-in.

In an example, the cluster manager node 140*a* implements the cluster manager 160 as a user process. In a particular non-limiting example, the operating system 230 is Linux-based. Other operating systems may be used, however, such as Unix-based operating systems and Windows-based operating systems. Although the operating system 230 is shown as running directly on the cluster manager node 140*a* (on bare metal), it may alternatively be run within a virtual machine or within a "container," i.e., a virtualized userspace process (e.g., a Docker container).

Figure 3:
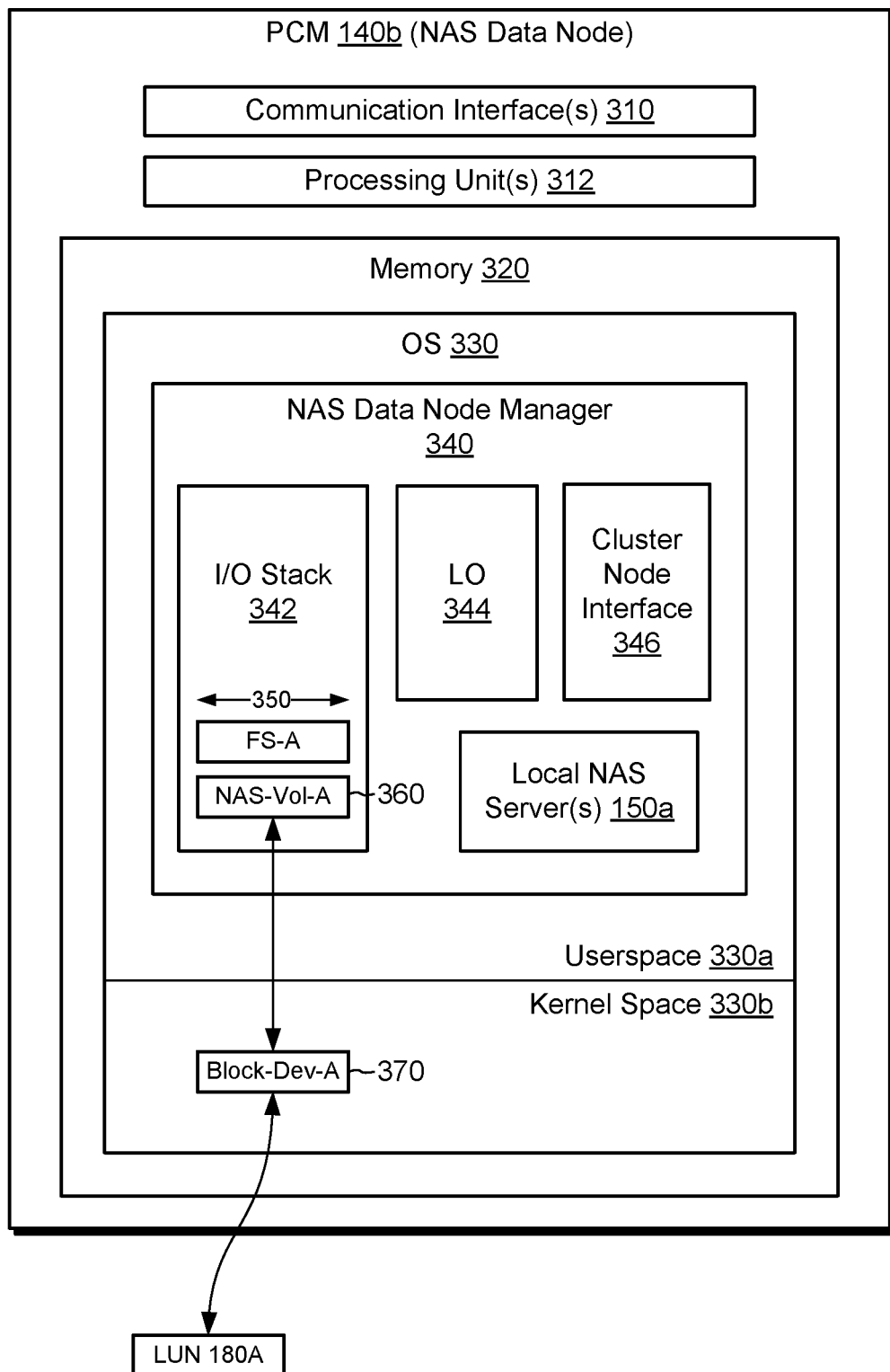
FIG. 3 is a block diagram of an example physical computing machine of the NAS cluster of FIG. 1 configured as a NAS data node.

FIG. 3 shows an example implementation of a physical computing machine configured as a NAS data node 140*b*. Physical computing machine 140*b* is intended to be representative of physical computing machines 140-2 through 140-M in FIG. 1.

NAS data node 140*b* includes one or more communication interfaces 310, a set of processing units 312, and memory 320, which may be configured similarly to the communication interfaces 210, set of processing units 212, and memory 220 of the cluster manager node 140*a* described above. In some examples, however, processors and memory on NAS data node 140*b* may be optimized for moving data and may thus include greater numbers of processing cores and/or larger amounts of memory. The set of processing units 312 and the memory 320 together form control circuitry, which is constructed and arranged to carry out various methods and functions as described herein. Also, the memory 320 includes a variety of software constructs realized in the form of executable instructions. When the executable instructions are run by the set of processing units 312, the set of processing units 312 of the NAS data node 140*b* is caused to carry out the operations defined by the software constructs. Although FIG. 3 specifically shows certain software constructs, it is understood that the memory 320 typically includes many other software constructs.

As further shown in FIG. 3, the memory 320 includes an operating system (OS) 330 (e.g., Linux, Unix, Windows, etc.), which includes userspace 330*a* and kernel space 330*b*. A NAS data node manager 340 runs within userspace 330*a*, e.g., as a userspace process, and includes the following software constructs:

I/O Stack 342. An execution path for processing I/O requests 112 arriving from hosts 110. Converts read and/or write requests directed to particular files or directories in specified file systems to corresponding block-based requests suitable for submission to block storage 170.

Local Orchestration 344. Manages procedures involving data storage and services within NAS data node 140*b*.

Cluster Node Interface 346. A management/control interface to cluster manager 160, e.g., via data node interface 244 in cluster manager node 140*a*.

Local NAS Server(s) 150*a*. NAS servers 150 hosted by this NAS data node 140*b*. Each of NAS servers 150*a* has its own FSDB 152 for tracking its own file systems.

FIG. 3 further shows an example relationship between a file system of a NAS server 150*a* and a LUN that backs the file system. The illustrated arrangement is intended to be representative of file system deployments across the NAS cluster 130. Here, a single file system FS-A is represented within the I/O stack 342. In an example, the file system FS-A has a continuous address space 350, which is denominated in blocks, for example, where a "block" is a smallest unit of storage that may be allocated by the file system. The I/O stack 342 maps reads and/or writes directed to FS-A to corresponding reads and/or writes of corresponding blocks within the address space 350. The file system FS-A is itself laid out on a NAS volume 360 (NAS-Vol-A), which is constructed in userspace 330*a*. NAS-Vol-A is itself laid out on a kernel-based block device 370 (Block-Dev-A), such as a Linux block device. Block-Dev-A itself is built upon a LUN 180A provided from block storage 170.

In an example, the cluster manager 160 directs activities to configure the illustrated arrangement, such as by provisioning LUN 180A to NAS data node 140*b*, such that the operating system 330 discovers LUN 180A and expresses it as a block device 370 (e.g., a Linux block device), which resides in kernel space 330*b*. The NAS data node manager 340 discovers Block-Dev-A and constructs NAS volume NAS-Vol-A upon Block-Dev-A (in Linux, developers may use libaio for this purpose). The NAS data node manager 340 may then format FS-A on NAS-Vol-A. In an example, there is a one-to-one relationship between each file system address in address space 350 and a corresponding address in each of NAS-Vol-A, Block-Dev-A, and LUN 180A, such that reads and writes directed to a particular block address in address space 350 translate to reads and writes of a corresponding block in LUN 180A.

Although FIG. 3 shows an example arrangement for implementing a single file system FS-A, one should appreciate that the NAS data node manager 340 may support many file systems, which may number in the thousands, in a similar manner. Thus, for example, each file system available from the NAS data node 140*b* is laid out on an associated NAS volume 360 in userspace 330*a*, which is built upon a block device 370 in kernel space 330*b*, which is in turn built upon an LUN 180 in block storage 170.

In an example, the NAS cluster 130 maintains uniqueness of identifiers of block devices that support file systems across the entire NAS cluster 130 (in Linux, developers may use udev may for this purpose). For example, the cluster manager 160 coordinates with each NAS data node 140b to ensure that each block device 370 supporting a file system has a unique ID (identifier) within the NAS cluster 130. Moreover, the NAS cluster 130 ensures that such block device IDs supporting file systems do not change, even when the NAS servers 150 that contain the file systems are moved from one NAS data node 140b to another. Thus, for example, the unique ID of a block device 370 supporting a file system stays the same across the NAS cluster 130, regardless of which node is realizing the block device 370.

Figure 4:
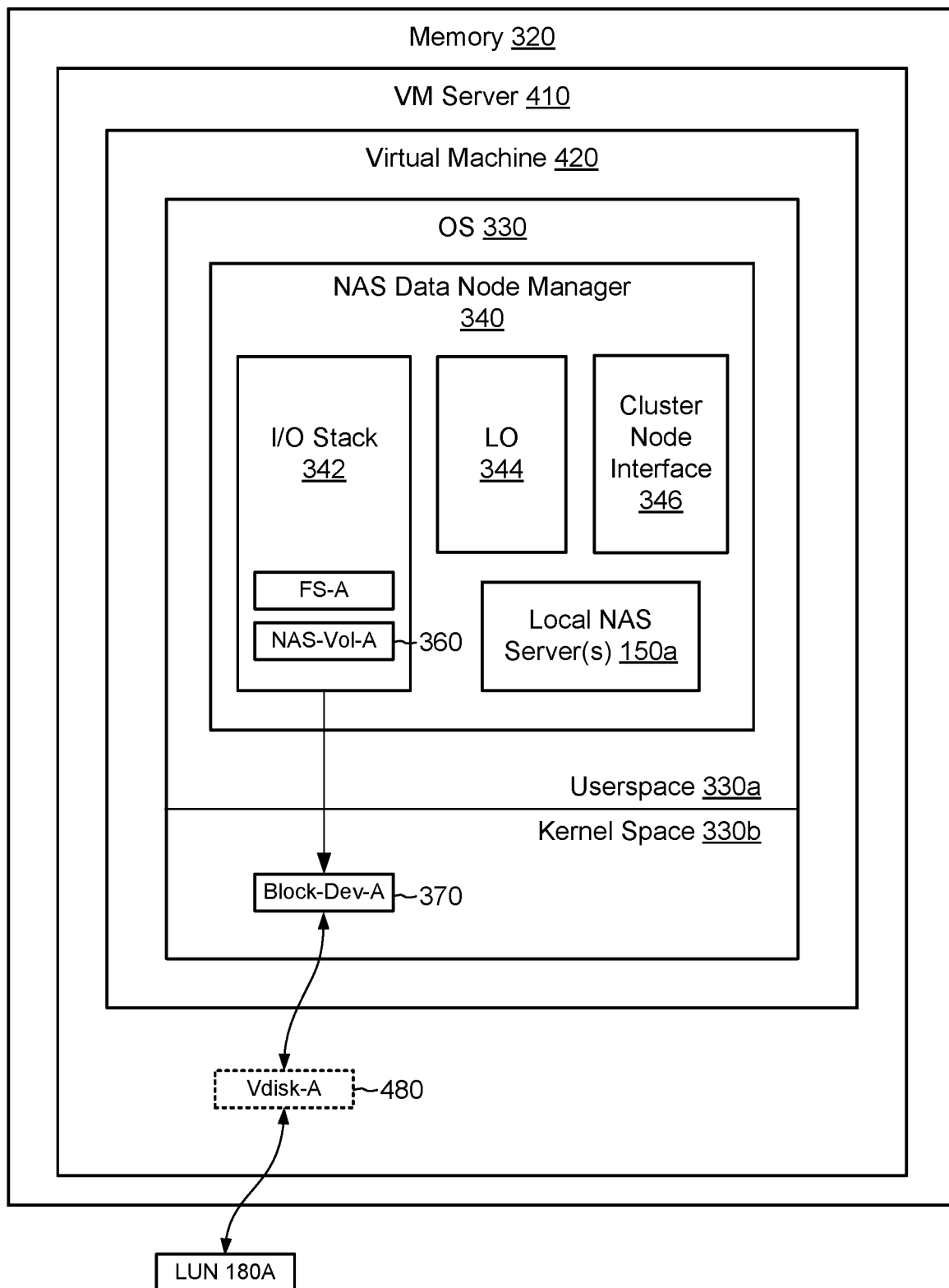
FIG. 4 is a block diagram showing an example NAS data node running within a virtual machine.

FIG. 4 shows another example arrangement for realizing a NAS data node 140b. Certain features in common with the example of FIG. 3 are omitted for the sake of clarity. The arrangement of FIG. 4 differs from that of FIG. 3 in that the operating system 330 in FIG. 4 runs within a virtual machine 420. The virtual machine 420 runs under a virtual machine server 410. In an example, the virtual machine server 410 is vSphere ESX server, available from VMWare, Inc., of Palo Alto, Calif. (now part of Dell Corporation). The virtual machine 420 is a VMWare virtual machine. Other virtual machine technologies may be used, such as KVM (kernel-based virtual machine) and Microsoft Hyper-V.

As shown in FIG. 4, the virtual machine 420 imposes additional layers, which the NAS cluster 130 must manage when deploying file systems backed by LUNs 180 in block storage 170. In this case, the cluster manager 160 directs block storage 170 to provision LUN 180A to the virtual machine server 410. The virtual machine server 410 creates a vdisk 480 (Vdisk-A) from the LUN 170A and provisions the vdisk 480 to the virtual machine 420. The operating system 330 (e.g., Linux) running within the virtual machine 420 discovers the vdisk 480 and creates a kernel-based block device 370. As before, the NAS data node 340 discovers the block device 370, builds a NAS volume 360 on the block device 370, and formats out the file system upon the NAS volume 360. The one-to-one address correspondence described above also applies to the vdisk 480, as well as to the NAS volume 360, block device 370, and LUN 180A.

Figure 5:
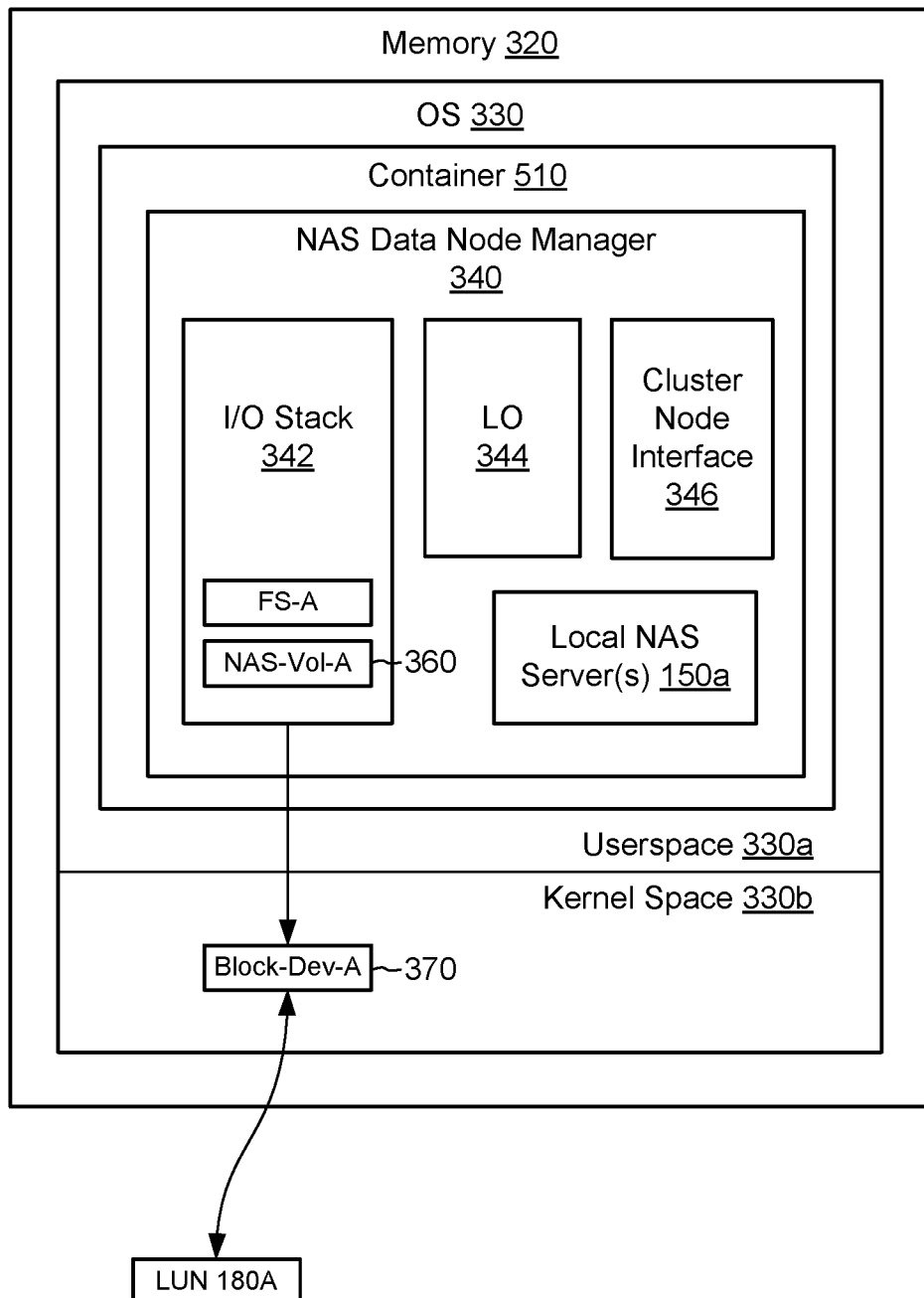
FIG. 5 is a block diagram showing an example NAS data node running within a container that provides a virtualized userspace environment.

FIG. 5 shows yet another example arrangement for realizing a NAS data node 140b. Here, the NAS data node 340 runs within a container 510, i.e., a virtualized userspace instance. The NAS data node 340 may run multiple containers, like the container 510, with each container providing a userspace execution environment that is isolated from similar environments provided by other containers. Unlike virtual machines, containers do not virtualize the OS kernel. Rather, all containers share the same kernel. Examples of containers 510 include Docker containers, available from Docker, Inc.

When using virtual machines or containers, it may be desirable to run the cluster manager 160 and the NAS data node manager 340 together on the same physical computing machine 140. For example, the cluster manager 160 may run in one virtual machine or container while the NAS data node manager 340 runs in another. Thus, it is not necessary for the cluster manager 160 to consume an entire physical computing machine 140 in the NAS cluster 130.

Figure 6:
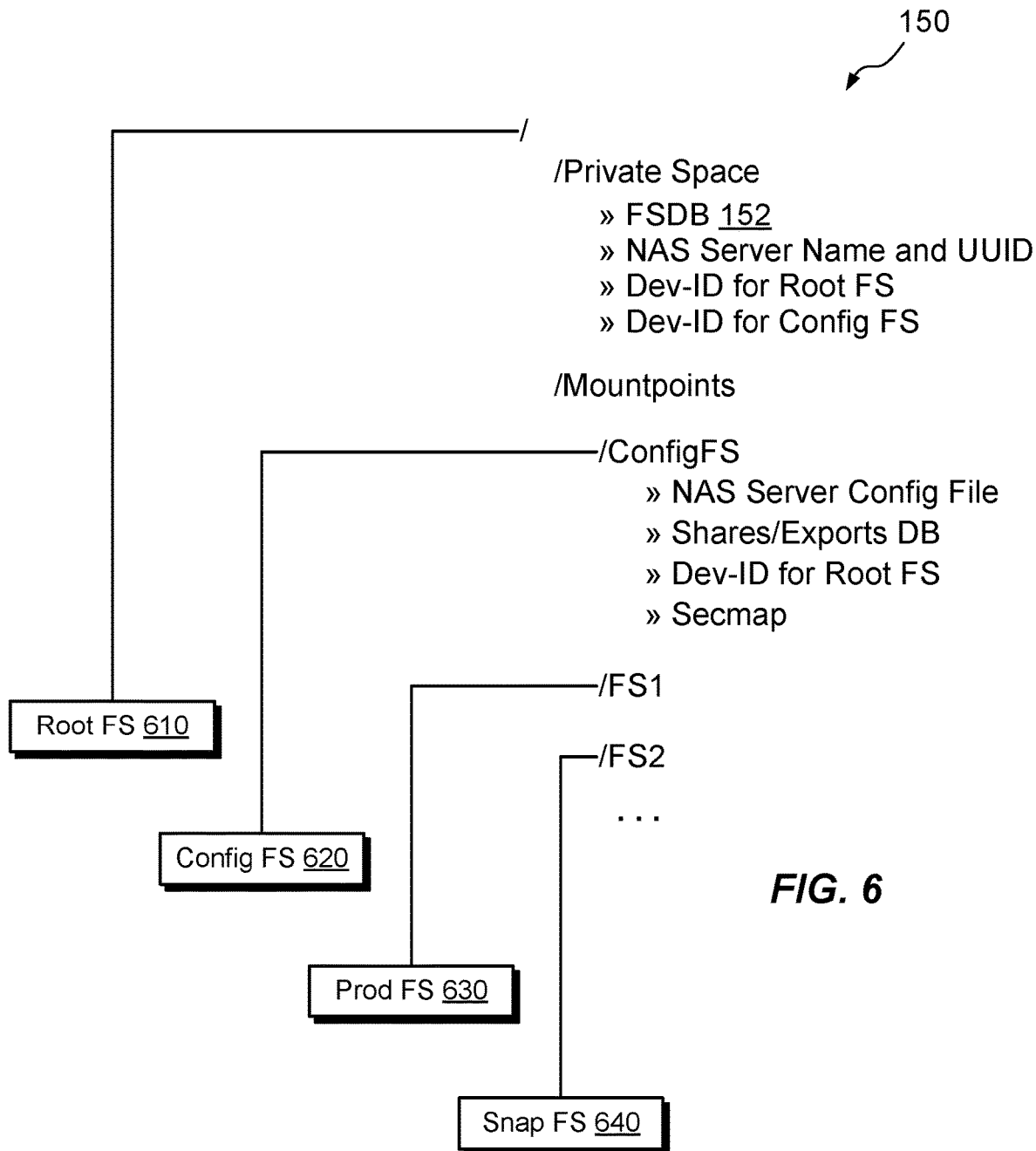
FIG. 6 shows an example arrangement of a file system in a NAS server.

FIG. 6 shows example features of a NAS server 150 in additional detail. Although a particular NAS server is shown, the illustrated structure is intended to be representative of NAS servers 150 in general. As shown, the NAS server 150 includes a root file system 610, a config file system 620, and any number of user file systems, which may include both production file systems and snapshots (others supported types of file systems may include migration targets). In the example shown, the NAS server 150 includes two user file systems. File system 620 is a production file system, and file system 640 is a snapshot.

The root file system 610 has a directory structure, which includes, for example, a root directory (slash), a "/Private Space" directory, and a "/Mountpoints" directory. In an example, the Private Space directory includes the above-described FSDB 152. Thus, for example, the FSDB 152 is itself implemented within a file system of the NAS server 150. In an example, the FSDB 152 tracks user file systems, such as file systems 630 and 640, but does not track the root file system 610 or the config file system 620. The Private Space directory may also include the following:

- NAS Server Name and UUID. The NAS server 150 has a name, which may be user-assigned or automatically assigned, and a UUID (universally unique identifier).
- Dev-ID for Root FS. A unique identifier of a block device 370 that supports the root file system 610. In an example, the root file system 610 is deployed within a NAS data node 340 using the same structure as described for FS-A in connection with FIGS. 3-5.
- Dev-ID for Config FS. A unique identifier of a block device 370 that supports the config file system 620. In an example, the config file system 620 is implemented within a NAS data node 340 using the same structure as described for FS-A in connection with FIGS. 3-5.

In some examples, the root file system 610 also stores redundant information, which the NAS cluster 130 may use to rebuild the management database 162, e.g., in the event of a failure of the cluster manager 160.

The config file system 620 stores configuration information describing the NAS server 150, such as a NAS server configuration file, a database of shares/exports, the Dev-ID for the Root FS (described above), and a secmap.

The Mountpoints directory in the root file system 610 exposes mount points on which other file systems may be mounted to join their namespaces. For example, the NAS data node manager 340 may mount the config file system 620 and each of the user file systems (630 and 640) on respective mount points in the Mountpoints directory to join their namespaces. The resulting namespace is specific to the NAS server 150 but is independent of the namespaces of other NAS servers (unless they are joined through other means).

In the arrangement shown, the FSDB 152 resides within the root file system 610 and thus moves wherever the root file system 610 moves. Thus, for example, when performing failover, load balancing, or other operations, a NAS data node 140b that takes over operation of a NAS server 150 can identify all of the NAS server's user file systems based only on receipt of the root file system 610.

FIG. 7 shows example information stored in each FSDB 152. For each user file system that belongs to a NAS server 150, the FSDB 152 for that NAS server 150 stores the following information.

- File System Name. May be user-defined or automatically defined.
- Export FSID. File system identifier (e.g., UUID or 32-bit value) used when file system is a replication or migration target.
- Internal FSID. File system identifier (e.g., UUID) used to identify a file system within NAS cluster 130.
- File System State. Whether the file system is currently mounted or unmounted.
- Dev-ID of File System. Identifier of kernel-based block device 370 (e.g., Linux block device) which supports the file system. Unique within NAS cluster 130 and invariant as NAS server 150 is moved from one physical computing machine 140 to another.

Mount Point Name and Options for File System. The mount point to which this file system is mounted in the Mountpoints directory of the root file system of this NAS server 150, as well as mount options (e.g., read-write, read-only, etc.). For example, the mount point for production file system 630 in FIG. 6 is shown as "/FS1."

Maximum Provisioned Capacity of File System. The maximum size to which the file system can grow. Specified, for example, when file system is created.

Nature of File System. Whether the file system is a production (primary) file system, a snapshot, or a migration target.

The elements of information listed in FIG. 7 promote efficiency in the NAS cluster 130. Some elements may be omitted and others that are not shown may be added. The listed elements are not intended to be exhaustive or to present strict requirements but are rather illustrative.

FIG. 8 shows example information stored in the management database 162. As indicated, the management database 162 organizes information both by tenant and by NAS server 150. As is known, a "tenant" is an entity on whose behalf data are stored, such as a company, some other type of organization, or a user. The NAS cluster 130 may store the data of multiple tenants and enforce strict measures to keep different tenants' data separate. For each tenant storing data in the NAS cluster 130, the management database 162 stores the following:

Tenant Name. A name of the tenant, such as "ACME Industries."

Tenant UUID. A universally unique identifier of the tenant.

ID of each NAS Node Exclusively Owned. An identifier of each NAS data node 140*b* (or, equivalently, of each NAS data node manager 340) that the tenant exclusively owns. Exclusively owned NAS nodes are available for storing only the owning tenants' data.

ID of each NAS Node Shared. An identifier of each NAS data node (or, equivalently, of each NAS data node manager 340) that the tenant does not exclusively own, but which the tenant may share with other tenants. A shared NAS node cannot be owned by any tenant.

In addition to this per-tenant information, the management database 162 also stores the following information for each NAS server 150:

Tenant UUID. A universally unique identifier of the tenant that owns the NAS server 150.

NAS Node ID. An identifier of the NAS data node 140*b* on which the NAS server 150 is currently operating.

NAS Server Name. A name of the NAS server 150. May be user-defined or automatically defined.

NAS Server UUID. A universally unique identifier of the NAS server 150.

State. The state of the NAS server 150, such as normal (operational), destination (the target of replication or migration), or offline.

Unique Dev-ID and LUN for Root FS. A unique identifier of a block device 370 that supports the root file system 610 (Dev-ID), and an identifier of the LUN in block storage 170 that backs that block device 370. "LUN" in this case refers to the logical unit number of the LUN and hence is an identifier.

Unique Dev-ID and LUN for Config FS. A unique identifier of a block device 370 that supports the config file system 620 (Dev-ID), and an identifier of the LUN in block storage 170 that backs that block device 370.

Unique Dev-ID and LUN for each User File System. For each user file system, a unique identifier of the block device 370 that supports that user file system (Dev-ID), and an identifier of the LUN in block storage 170 that backs that block device 370.

The particular data elements described above are intended to be illustrative rather than limiting.

One should appreciate that the illustrated example provides LUN information only in the management database 162 (FIG. 8) but not in the FSDB 152 (FIG. 7). In addition, only the FSDB 152 provides file system names and FSIDs. The illustrated distribution of information between the management database 162 and the FSDBs 152 is intended to reduce reliance on the cluster manager 160 when performing most data management tasks, while also providing the cluster manager 160 with the information it needs to support its role in managing the NAS cluster 130.

FIGS. 9-13 show example sequences for performing various activities in the NAS cluster 130. Each of these figures identifies nodes in the NAS cluster 130 according to their roles as cluster manager 160 and NAS data nodes (labeled A-M), rather than by physical computing machines 140. It should be noted that activities ascribed below to the NAS data nodes A-M may be performed by the NAS data node managers 340 running on the respective NAS data nodes.

Figure 9:
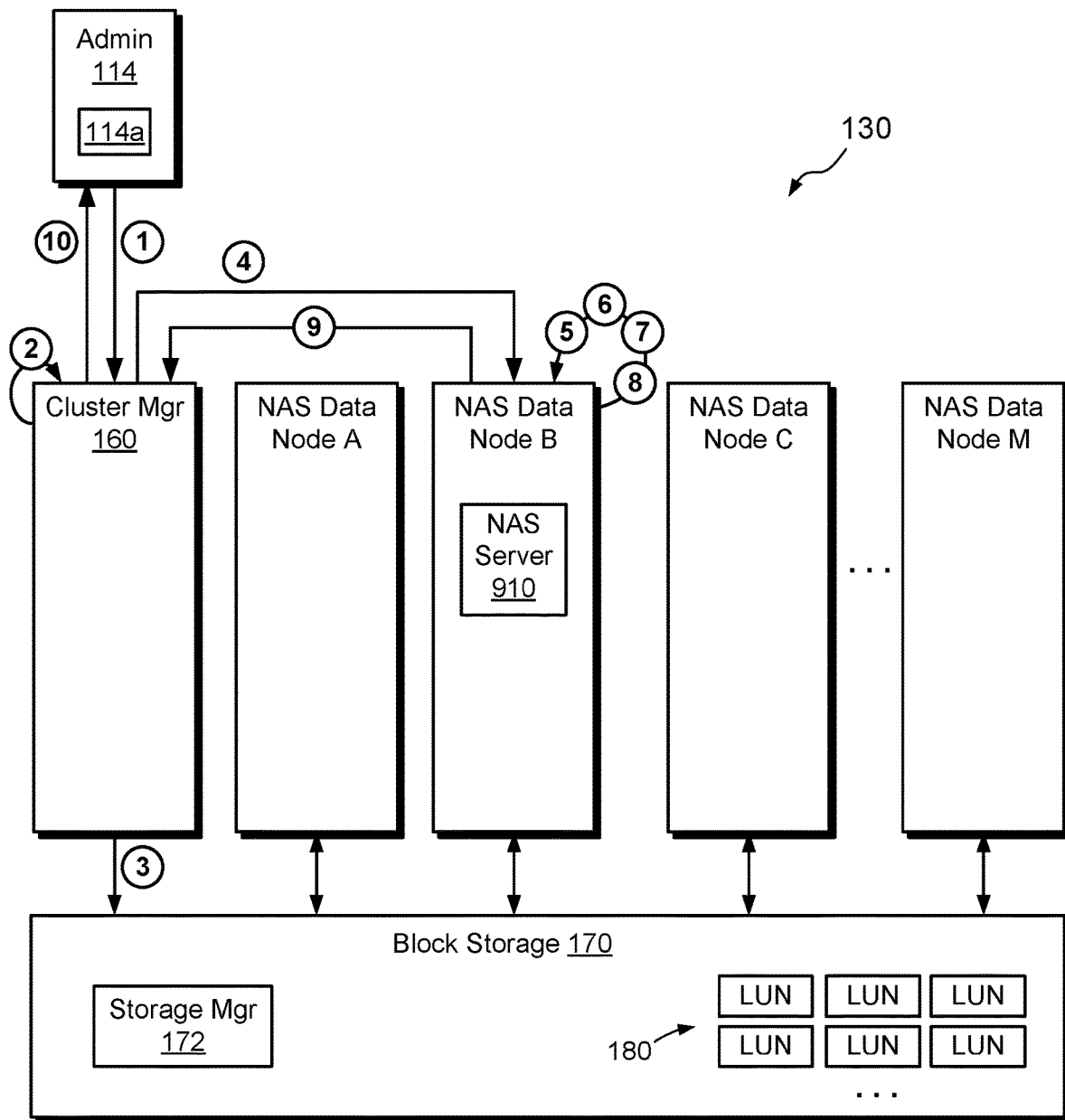
FIG. 9 shows an example sequence for creating a new NAS server in the NAS cluster of FIG. 1.

FIG. 9 shows an example sequence for creating a NAS server 910 in the NAS cluster 130. The encircled numerals depict the following example sequence of operations:

1. Receive, by cluster manager 160, a request from administrative program 114*a* to create NAS server 910 on NAS data node B. The instruction may be issued by an administrator or other user and may include a name of the NAS server 910.

2. Allocate, by cluster manager 160, UUID of NAS server 910.

3. Allocate, by cluster manager 160, two new unique device IDs for block devices 370 that support the root file system 610 and the config file system 620 of the NAS server 910; direct block storage 170 to allocate two LUNs 180, one for the root file system 610 and another for the config file system 620; bind together the unique device ID for the root file system with the LUN for the root file system; bind together the unique device ID for the config file system with the LUN for the config file system.

4. Cluster manager 160 calls into NAS data node B and provides NAS server name, UUID, and device IDs of block devices 370 that support root file system 610 and config file system 620.

5. NAS data node B formats root file system and config file system over respective block devices 370.

6. NAS data node B mounts root file system 610 as "I" and config file system 620 as "/ConfigFS" (see FIG. 6).

7. NAS data node B initializes config file system 620 (e.g., Shares/Exports DB and NAS Server Config File); initializes FSDB 152 in root file system.

8. NAS data node B records name and UUID of NAS server 910 in root file system 610; records device ID of block device 370 supporting root file system 610 and device ID block device 370 supporting config file system 620; records in FSDB 152 device IDs of block devices 370 supporting user file systems, if any; records redundant information stored in management database 162.

9. Cluster manager 160 records information about NAS server 910 in management database 162 (e.g., in per-NAS-server information; see FIG. 8).
10. Cluster manager 160 acknowledges request received in step 1.

As shown, the actions performed to provision the NAS server are kept mostly within the NAS data node B, with limited interactions with block storage 170.

Figure 10:
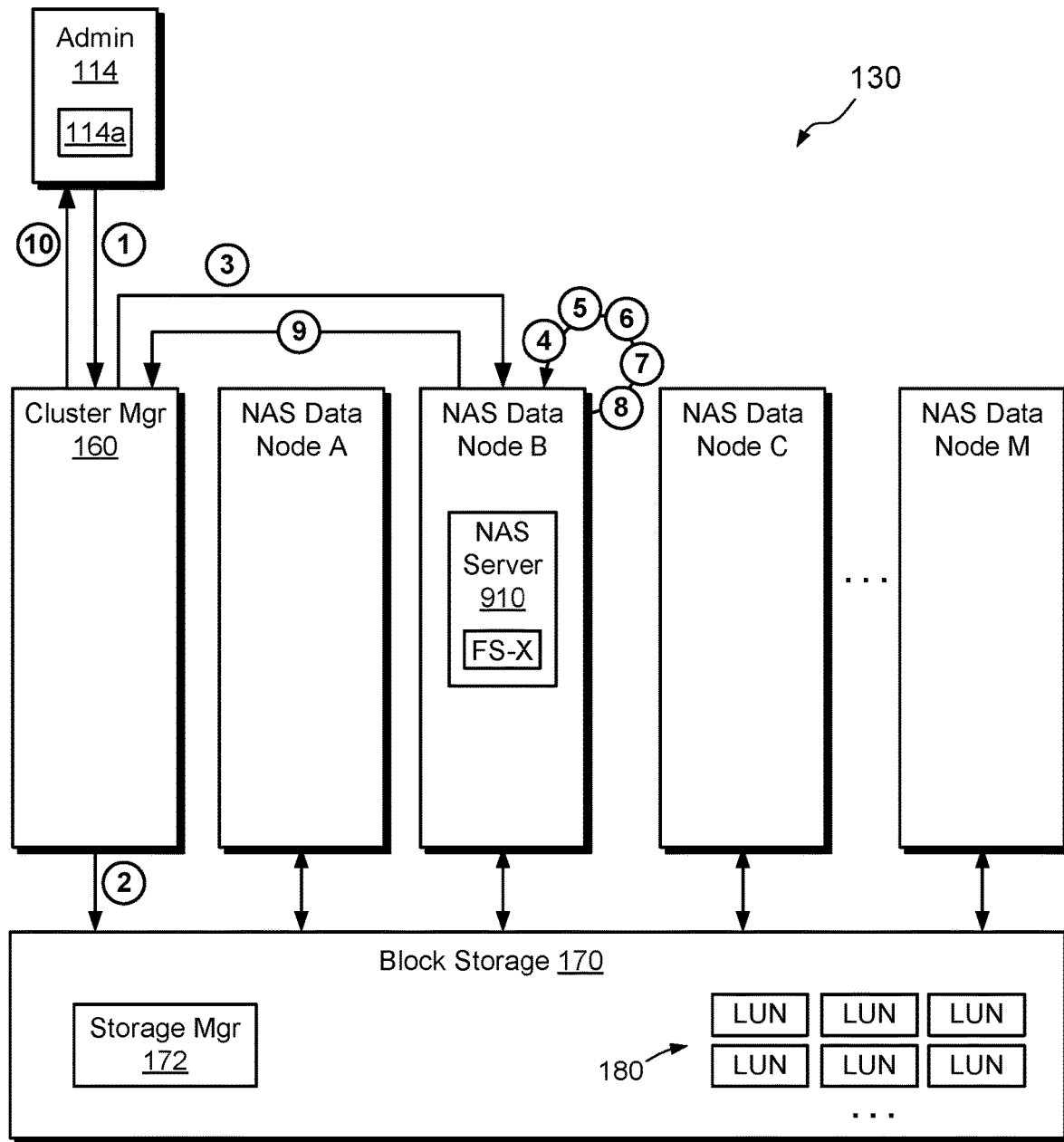
FIG. 10 shows an example sequence for creating a new file system within a NAS server.

FIG. 10 shows an example sequence for creating a file system in the NAS cluster 130. The encircled numerals in FIG. 10 depict the following example sequence of operations:

1. Receive, by cluster manager 160, a request from administrative program 114a to create a file system FS-X on NAS data node B. The instruction may be issued by an administrator or other user and may include a name of the NAS server 910.
2. Allocate, by cluster manager 160, a new device ID for a block device 370 that supports the file system FS-X; direct block storage 170 to allocate a LUN 180 for FS-X; bind together the unique device ID with the LUN for FS-X.
3. Cluster manager 160 calls into NAS data node B and provides NAS server UUID, device ID of block device 370 that supports FS-X, as well as Maximum Provisioned Capacity of FS-X, Mount Point Name and Options for FS-X, and the Nature of FS-X, e.g., production, snapshot, or migration.
4. NAS data node B allocates UUID for FS-X. If nature of file system is "Production," the same UUID is used for both Export FSID and Internal FSID.
5. NAS data node B formats the new file system on the block device 370 indicated by the received device ID.
6. NAS data node B creates a mount point on the root file system 610 of the NAS server 910.
7. NAS data node B records information about FS-X in the FSDB 152 of NAS server 910.
8. NAS data node B mounts FS-X.
9. Cluster manager 160 updates management database 162 for NAS server 910 with newly allocated device ID of block device 370 and LUN for FS-X.
10. Cluster manager 160 acknowledges request received in step 1.

Here, as well, the actions performed are mostly kept within the NAS data node B, with limited interactions with block storage 170.

Figure 11:
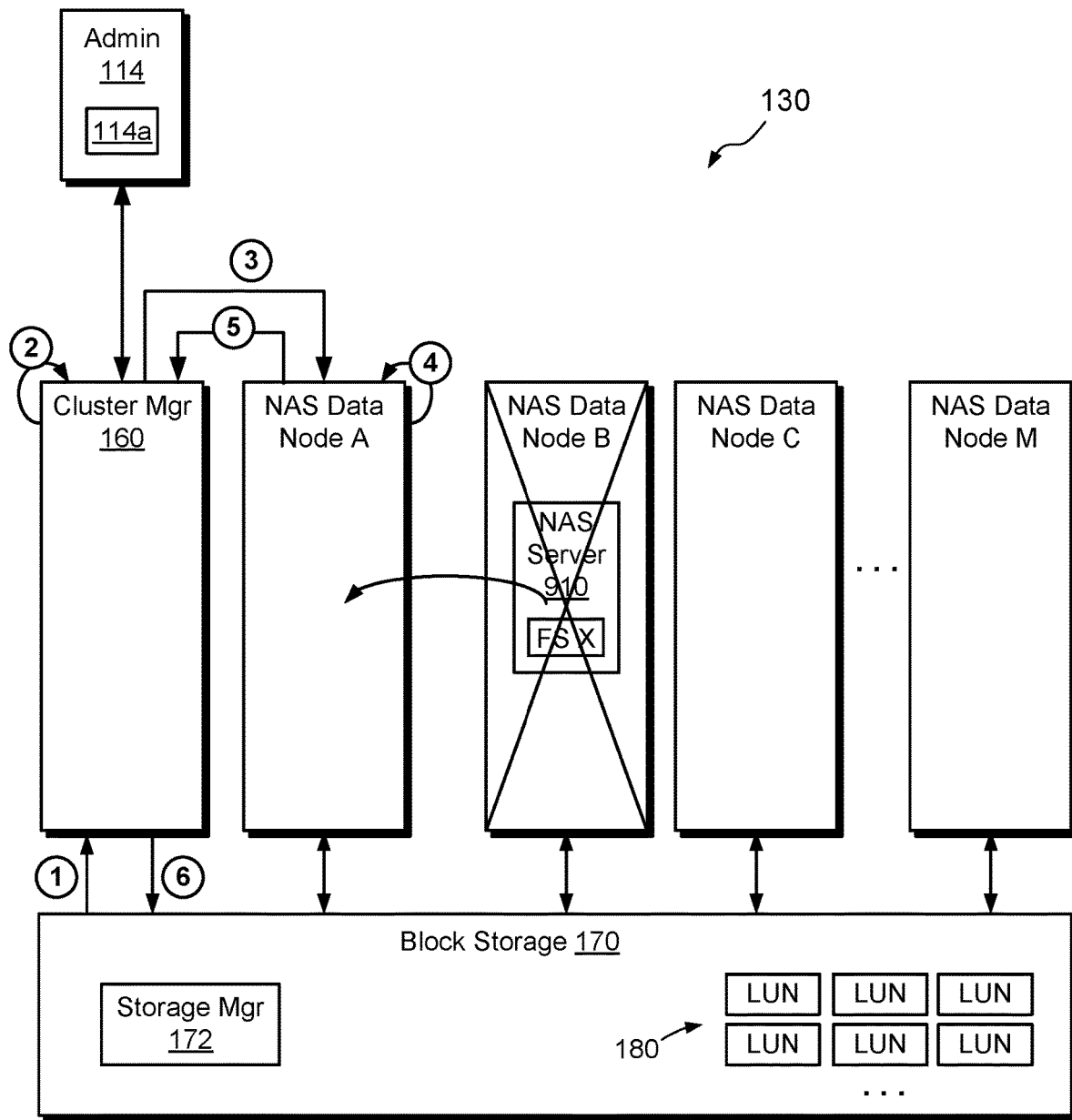
FIG. 11 shows an example sequence for performing failover.

FIG. 11 shows an example sequence for conducting failover of a NAS data node in the NAS cluster 130. The encircled numerals in FIG. 11 depict the following example sequence of operations:

1. Receive, by cluster manager 160, a notification from block storage 170 that NAS data node B has failed. Alternatively, the cluster manager 160 monitors an operational state of each of the NAS data nodes and detects on its own that NAS data node B has failed.
2. Cluster manager 160 accesses management database 162 and changes NAS Node ID (FIG. 8) for NAS server 910 to NAS data node A.
3. Cluster manager 160 calls into NAS data node A and provides name of NAS server 910, UUID of NAS server 910, and device IDs of block devices 370 that support root file system 610 and config file system 620 of NAS server 910. In some examples, the cluster manager 160 may reassign the LUNs 180 that back the root file system 610, config file system 620, and each of the user file systems of NAS server 910 from NAS data node B to NAS data node A.
4. NAS data node A brings up NAS server 910.
5. NAS data node A indicates that NAS server 910 is operational.
6. Cluster manager 160 acknowledges completion of failover.

In some examples, the cluster manager 160 monitors not only operational state, but also spare capacity of each of the NAS data nodes. The cluster manager 160 then bases its determination of failover node at least in part on spare capacity. For example, the cluster manager 160 may have determined that NAS data node A was not very busy, or was less busy than other nodes, such that it was a good candidate for receiving NAS server 910.

In some examples, the failing NAS data node may support numerous NAS servers 150, which become stranded by the failure of that NAS data node. In such examples, the cluster manager 160 may transfer operation of the stranded NAS data nodes based at least in part on spare capacity of still-functioning NAS data nodes, performing load balancing in the process. For example, the cluster manager 160 may distribute the stranded NAS servers across multiple NAS data nodes in the cluster 130, so as to balance workload across NAS data nodes and to avoid overloading any one NAS data node.

Some virtual machine platforms support their own mechanisms for failover. For example, VMWare uses vMotion to support movement of virtual machines from one physical computer to another. In examples where NAS data nodes operate within virtual machines, such as in FIG. 4, virtual machine failover may be disabled for NAS data nodes, such that the cluster manager 160 remains in control of the placement of NAS servers 150 in the NAS cluster 130.

In some examples, virtual machine failover may be preserved for the cluster manager 160 itself. For instance, in cases where the cluster manager 160 runs in a virtual machine and a failure occurs in that virtual machine or in the associated physical computing machine, vMotion or similar procedures may restore operation of the cluster manager 160 from a different physical computing machine.

Figure 12:
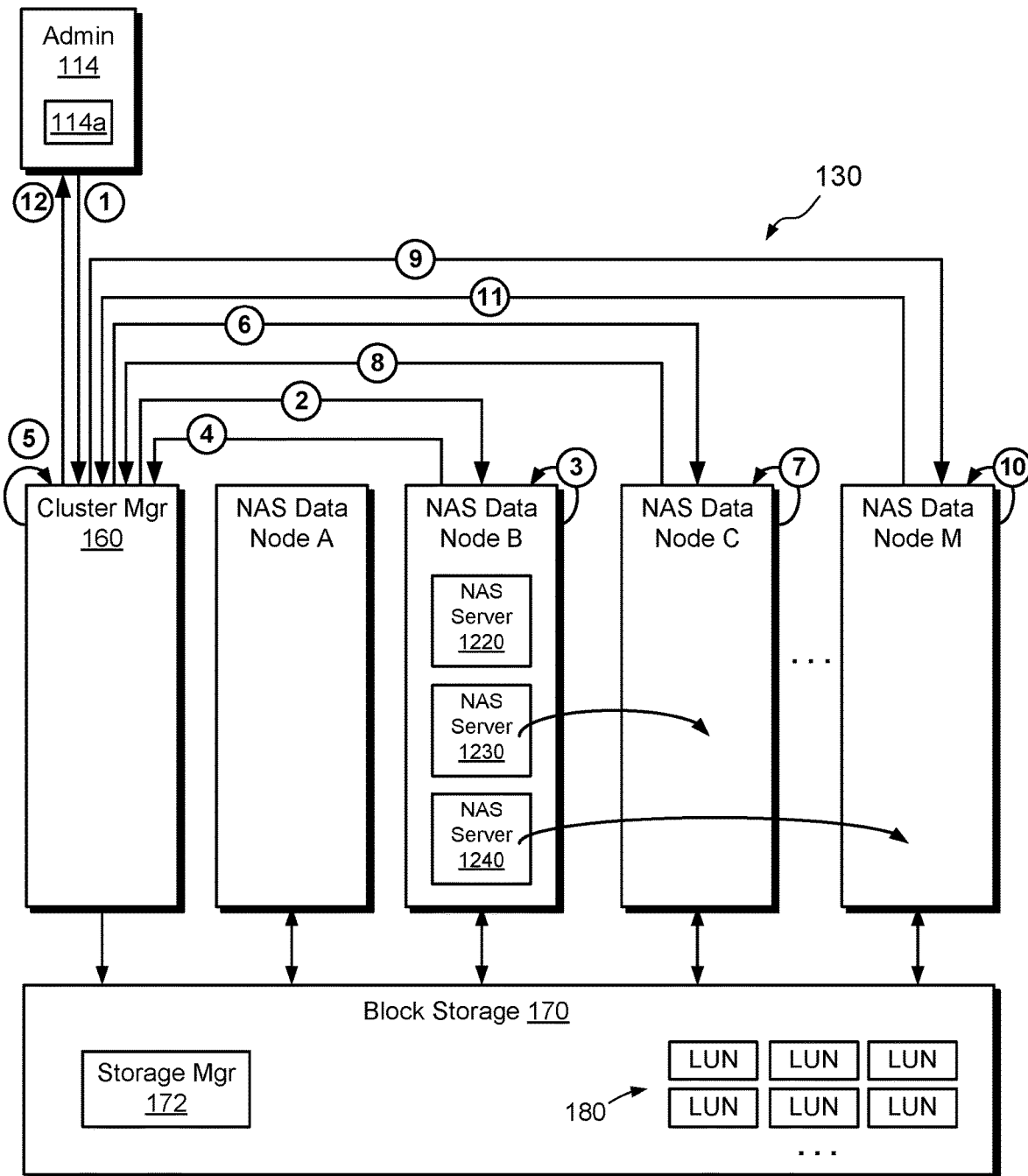
FIG. 12 shows an example sequence for performing load balancing.

FIG. 12 shows an example sequence for performing load balancing in the NAS cluster 130. The mechanics for load balancing are similar to those for performing failover, except that there is no failing node. In an example, the sequence proceeds as follows:

1. Receive, by cluster manager 160, a notification from block storage 170 that NAS data node B is overloaded. Alternatively, in some examples, the cluster manager 160 itself monitors the spare capacity of NAS data nodes and detects on its own that NAS data node B is overloaded, e.g., by determining that the spare capacity has fallen below a predetermined threshold.
2. Cluster manager 160 calls in to NAS data node B and directs it bring down one or more of its NAS servers. In this example, the cluster manager 160 directs NAS node B to bring down NAS servers 1230 and 1240, but not NAS server 1220.
3. NAS data node B brings down NAS server 1220 and NAS server 1230.
4. NAS data node B acknowledges to cluster manager 160 that NAS servers 1220 and 1230 are down.
5. Cluster manager 160 accesses management database 162, changes NAS Node ID (FIG. 8) for NAS server 1230 to NAS data node C, and changes NAS Node ID for NAS server 1240 to NAS data node M. The cluster manager 160 may previously have determined that NAS data nodes C and M have spare capacity and are good candidates for receiving NAS servers 1230 and 1240.

6. Cluster manager 160 calls into NAS data node C and provides name of NAS server 1230, UUID of NAS server 1230, and device IDs of block devices 370 that support root file system 610 and config file system 620 of NAS server 1230. In some examples, cluster manager 160 may reassign the LUNs 180 that back the root file system 610, config file system 620, and each of the user file systems of NAS server 1230 from NAS data node B to NAS data node C.
7. NAS data node C brings up NAS server 1230.
8. NAS data node C indicates that NAS server 1230 is operational.
9. Cluster manager 160 calls into NAS data node M and provides name of NAS server 1240, UUID of NAS server 1240, and device IDs of block devices 370 that support root file system 610 and config file system 620 of NAS server 1240. In some examples, the cluster manager may reassign the LUNs 180 that back the root file system 610, config file system 620, and each of the user file systems of NAS server 1240 from NAS data node B to NAS data node M.
10. NAS data node M brings up NAS server 1240.
11. NAS data node M indicates that NAS server 1240 is operational.
12. Cluster manager 160 acknowledges completion of load balancing.

One should appreciate that the order of activities above can be varied. For example, movement of NAS server 1230 may be performed completely before initiating movement of NAS server 1240. Alternatively, the acts for moving NAS servers 1230 and 1240 may be performed in parallel or interleaved in any suitable manner.

Figure 13:
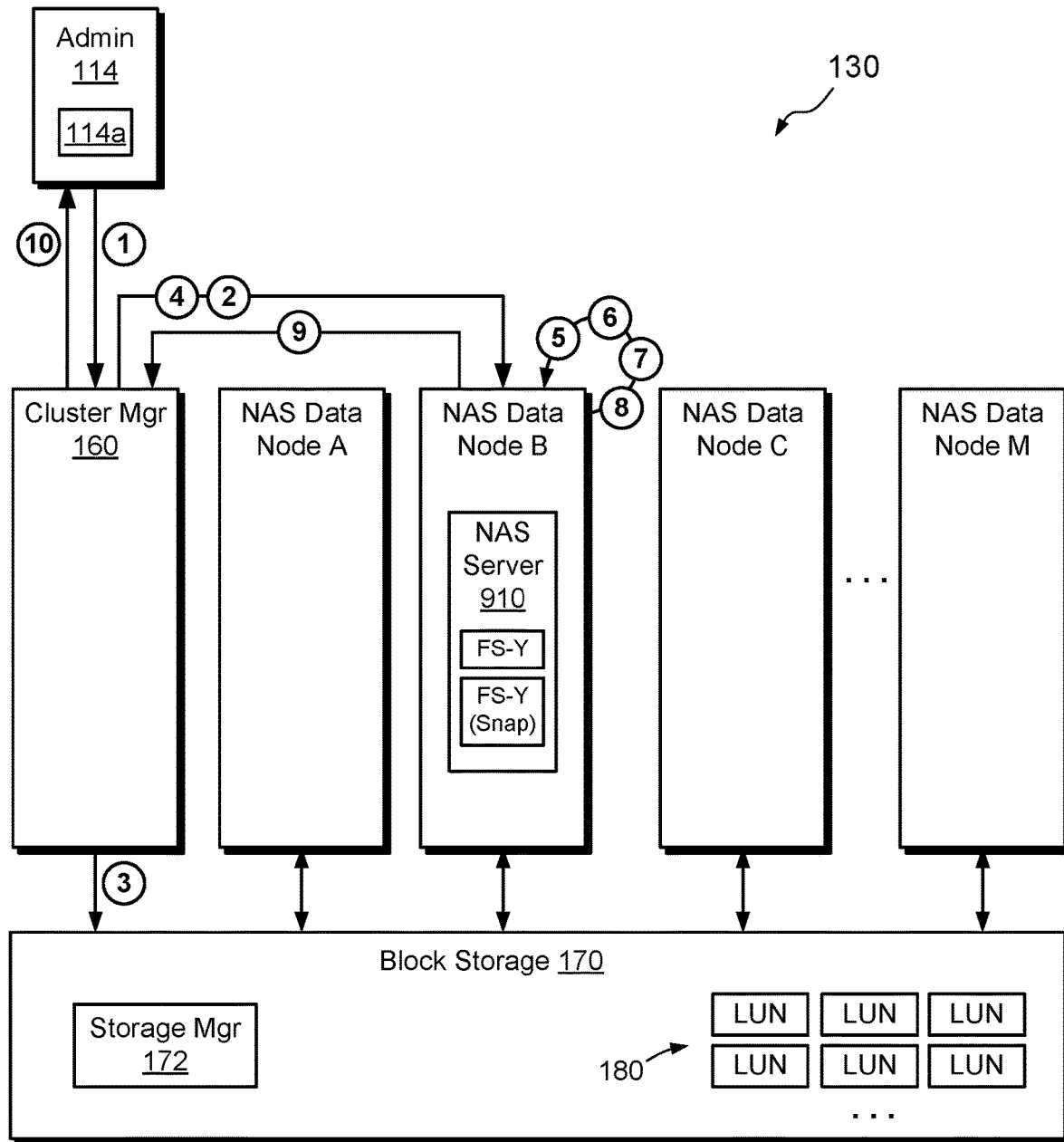
FIG. 13 shows an example sequence for generating a snapshot.

FIG. 13 shows an example sequence for creating a snapshot FS-Y (Snap) of a file system FS-Y in the NAS cluster 130. As will be apparent, the cluster manager 160 directs the creation of the snapshot and the block storage 170 performs the underlying snapshot activities. An example sequence proceeds as follows:

1. Receive, by cluster manager 160, a request to create a snapshot of FS-Y in NAS server 910.
2. Cluster manager 160 queries NAS server 910 to obtain, from its FSDB, device ID of block device 370 that supports FS-Y. This device ID is referred to herein as "DEV-ID(Y)."
3. Cluster manager 160 accesses management database 162 and identifies the LUN 170 "LUN(Y)" associated with DEV-ID(Y); cluster manager 160 calls into block storage 170 and directs block storage 170 to create a snapshot of the LUN(Y); block storage 170 creates a new LUN "LUN(YS)" as a snapshot of LUN(Y); block storage 170 also creates a new device ID "DEV-ID (YS)" for a block device 370 that will support LUN (YS); Cluster manager 160 returns LUN(YS) identifier and DEV-ID(YS) to the cluster manager 160.
4. Cluster manager 160 calls into NAS data node B and provides UUID of NAS server 910, DEV-ID(YS), mount point, and designation as "Snapshot."
5. NAS data node B allocates new FSID for the new snapshot FS-Y (Snap). For snapshot purposes, NAS data node B applies the same new FSID for both Export FSID and Internal FSID.
6. NAS data node B creates new mount point on the root file system 610 of NAS server 910.
7. NAS data node B records received information about the new file system (the snapshot) in the FSDB 152 of NAS server 910.
8. NAS data node B mounts the new file system (the snapshot).
9. NAS data node B acknowledges success; cluster manager 160 updates management database 162 for NAS server 910 with newly created DEV-ID(YS) and LUN (YS).
10. Cluster manager 160 acknowledges completion of snapshot request.

Figure 14:
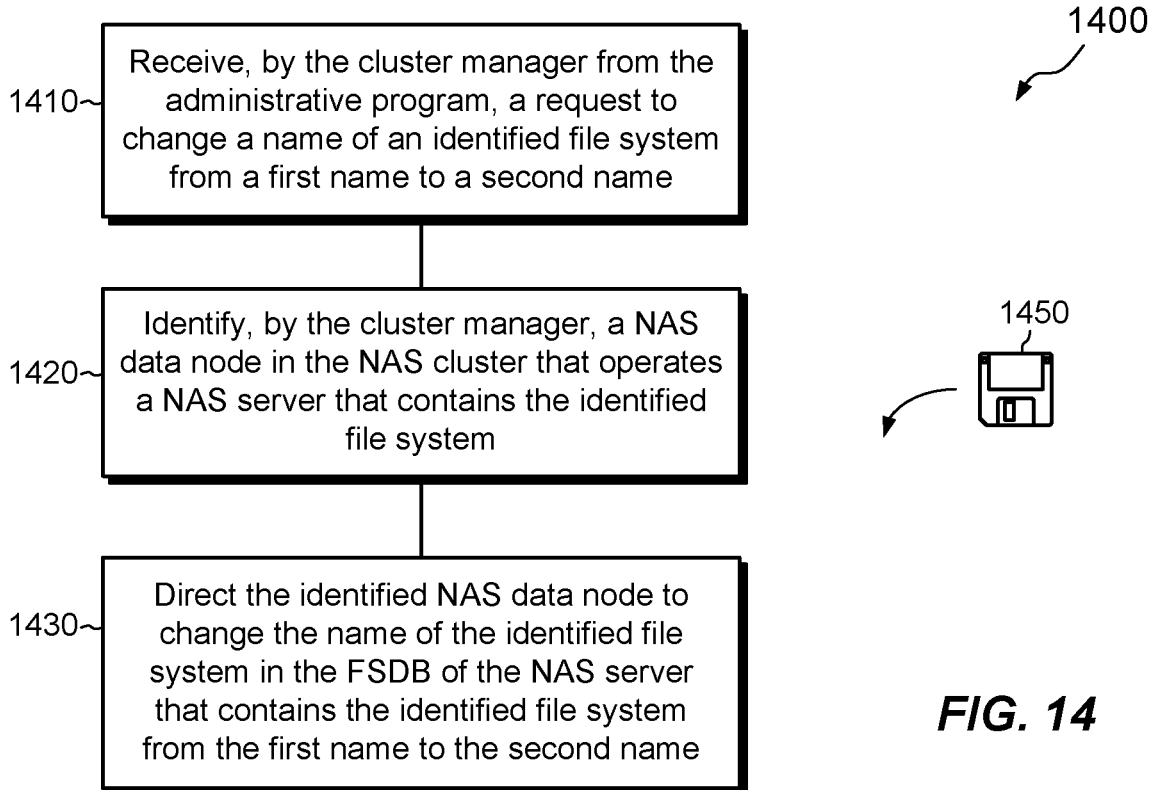
FIG. 14 is a flowchart showing an example method for renaming a file system.
Figure 15:
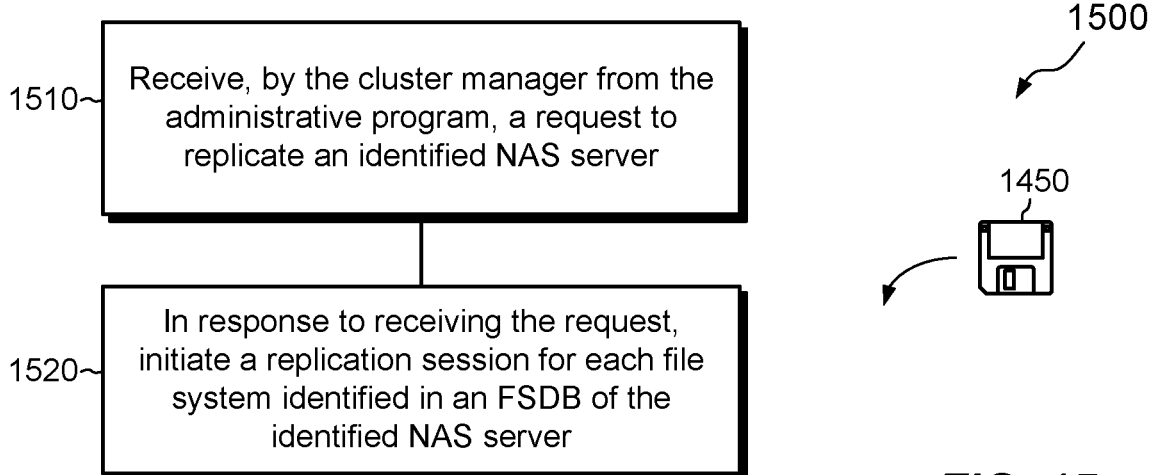
FIG. 15 is a flowchart showing an example method of performing replication.
Figure 16:
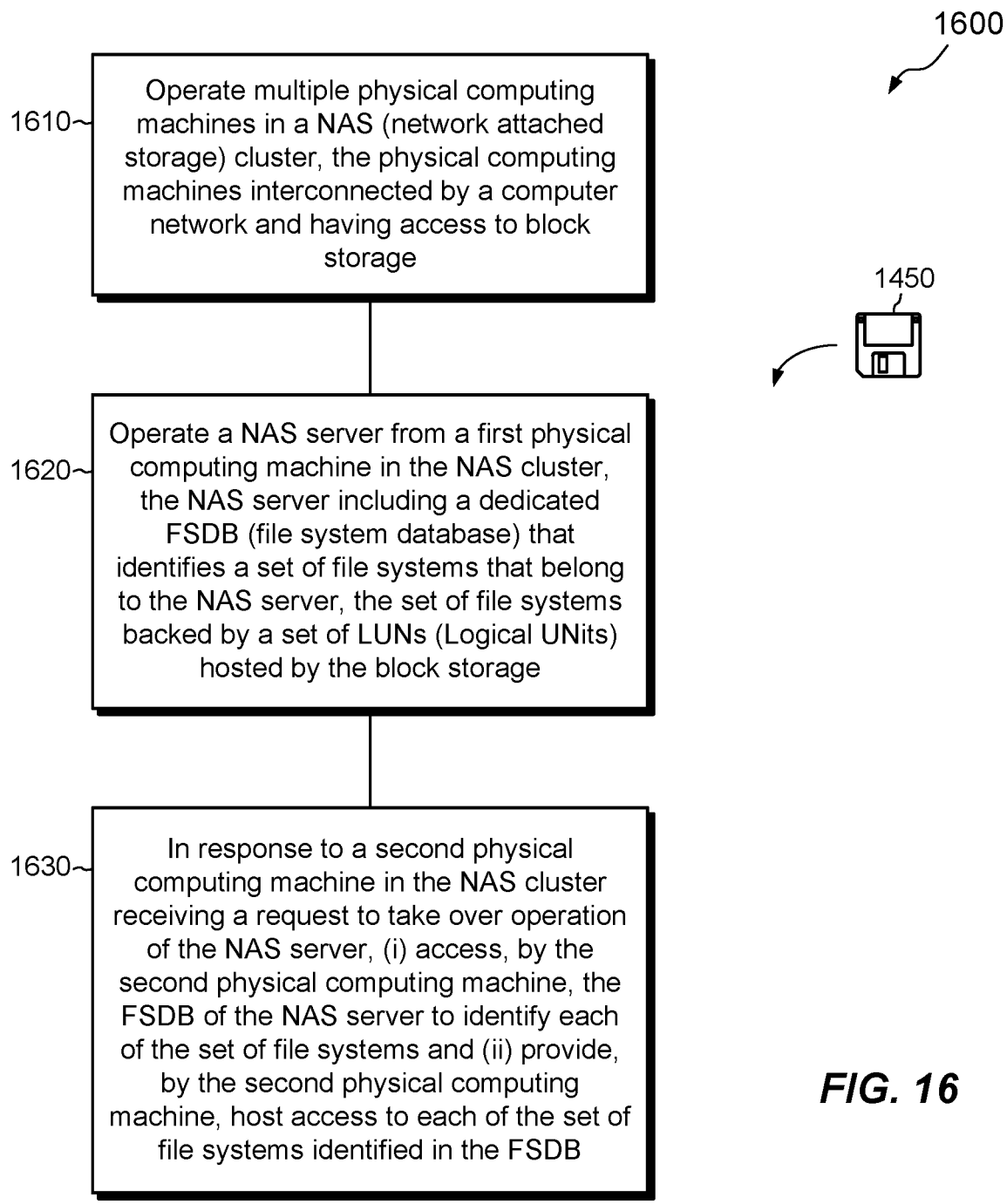
FIG. 16 is a flowchart showing an example method of managing data storage.

FIGS. 14-16 show example methods 1400, 1500, and 1600 that may be carried out in connection with the environment 100. The methods 1400, 1500, and 1600 are typically performed, for example, by the software constructs described in connection with FIGS. 1-3, which reside in the memory 220 and 320 of the respective physical computing machines 140a and 140b and are run by the respective sets of processing units 212 and 312. The various acts of methods 1400, 1500, and 1600 may be ordered in any suitable way. Accordingly, embodiments may be constructed in which acts are performed in orders different from those illustrated, which may include performing some acts simultaneously.

FIG. 14 shows an example method 1400 for changing the name of a file system and demonstrates an example distribution of information between the cluster manager 160 and the NAS data nodes.

At 1410, the cluster manager 160 receives a request, e.g., from administrative program 114a, to change the name of an identified file system from a first name, such as "myFS" to a second name, such as "yourFS."

At 1420, the cluster manager 160 identifies the NAS data node in the NAS cluster 130 that operates the NAS server 150 which contains the identified file system. For example, the cluster manager 160 may broadcast a request that specifies the name myFS to all NAS data nodes in the NAS cluster 130. Each NAS data node may then query its own FSDBs 152 (e.g., the FSDBs for all NAS server 150 that it hosts). The NAS data node that finds myFS in one of its FSDBs responds to the request and identifies itself to the cluster manager 162.

At 1430, the cluster manager 160 directs the identified NAS data node to change the name of the file system from myFS to yourFS in the FSDB 152 of the NAS server that contains the identified file system. In an example, no changes are made in the management database 162, as this database does not track file system names.

FIG. 15 shows an example method 1500 for performing replication in the NAS cluster 130. At 1510, the cluster manager 160 receives a request from administrative program 114a to replicate an identified NAS server 150. One should appreciate that the request is to replicate a NAS server, rather than any individual file systems. Thus, replication is requested here at per-NAS-server granularity.

At 1520, in response to the request to replicate the NAS server, the cluster manager 160 identifies each file system listed in the FSDB 152 for that NAS server 150 and proceeds to initiate a replication session for each identified file system. Replication activities then proceed together for all identified file systems. The underlying replication transport may be synchronous, as in continuous replication, and/or asynchronous, as in snapshot-shipping replication. The cluster manager 160 orchestrates replication activities. The replication transport may be operated by the NAS data nodes, by the block storage 170, or by both acting together.

FIG. 16 shows an example method 1600 for managing data storage and provides a summary of certain activities and features described above.

At 1610, multiple physical computing machines 140 operate in a NAS (network attached storage) cluster 130. The physical computing machines 140 are interconnected by a computer network 132 and have access to block storage 170.

At 1620, a NAS server 150 operates from a first physical computing machine (e.g., 140-3) in the NAS cluster 130. The NAS server 150 includes a dedicated FSDB (file system database) 152 that identifies a set of file systems 156 that belong to the NAS server 150. The set of file systems 156 is backed by a set of LUNs (Logical UNits) 180 hosted by the block storage 170.

At 1630, in response to a second physical computing machine (e.g., 140-2) in the NAS cluster receiving a request to take over operation of the NAS server 150, the second physical computing machine 140-2 accesses the FSDB 152 of the NAS server 150 to identify each of the set of file systems 156 and the second physical computing machine 140-2 provides host access to each of the set of file systems 156 identified in the FSDB 152. Such host access may include, for example, allowing hosts 110 to mount any of the set of file system 156 and to issue I/O requests 112 to such file systems for effecting reads and writes.

An improved technique has been described for managing data storage, which provides multiple physical computing machines 140 and block storage 170 arranged in a NAS cluster 130. The physical computing machines 140 run NAS servers 150, with each NAS server 150 including an FSDB 152 that identifies a set of file systems 156 that belong to the NAS server 150. The FSDB 152 provides a local repository of information about contents of the NAS server 150, which enables the NAS server 150 to carry information about its own contents with it as it moves from one physical computing machine 140 to another. The file systems identified by the FSDB 152 may include both production file systems and snapshots, such that snapshots as well as production objects follow a NAS server as it moves from one physical computing machine to another. The particular distribution of information within the NAS cluster 130 reduces reliance on centralized data and enables the NAS cluster 130 to scale to very large sizes while avoiding performance bottlenecks.

Section II: File System Providing Optimizations for NAS Cluster.

This section describes an improved technique for operating a file system in a NAS (network attached storage) cluster, which simplifies communications with block storage by deploying a file system on a thin LUN in block storage and unilaterally provisioning storage space to the file system without extending provisioning activities to the LUN. Rather, the file system proceeds as if the storage space is available from the LUN without reserving space or confirming availability.

This section further describes an improved technique for realizing and operating a file system in a NAS cluster. The technique provisions a LUN from block storage and renders a block device in a NAS data node, where the block device is built on the LUN. The data node creates a local volume, built on the block device, and the file system is deployed on the local volume. The file system, the local volume, the block device, and the LUN all have address spaces, and the address space of each corresponds one-to-one with the address space of each of the others.

Embodiments described in this section may be realized in the environment and in the example NAS cluster as presented in Section I. However, embodiments presented in this section are not limited to the environment of Section I or to the NAS cluster as described. Rather, embodiments presented in this section may be used in other environments, in other NAS clusters, and in computerized technology that does not require a NAS cluster. Further, as used herein, the term "NAS cluster" describes an electronic system that includes multiple data nodes having access to block storage and configured to service file-based requests for data over a network. A "data node" herein is a node that processes I/O requests from host devices for effecting reads and/or writes of data persisted in the block storage. Data nodes may be realized on physical computing machines or in virtual machines or containers that run on physical computing machines.

Figure 17:
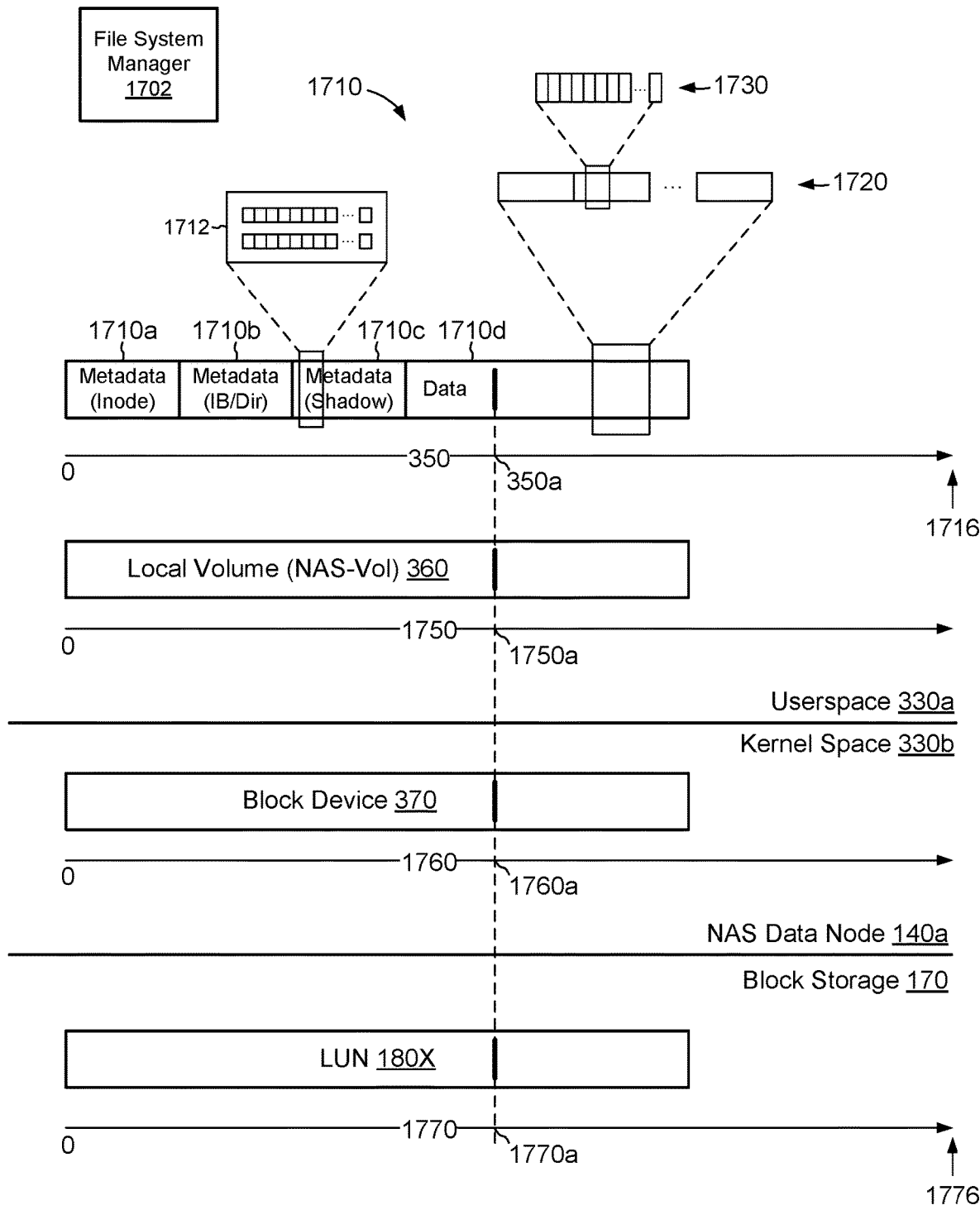
FIG. 17 is a block diagram showing an example arrangement of structures for realizing a file system, for example, on a data node of a NAS cluster.

FIG. 17 shows an example arrangement for realizing a file system 1710 in a computerized apparatus, such as a data node 140b of NAS cluster 130 (FIG. 3). Here, a file system 1710 is built upon a local volume 360 (NAS-Vol), which is itself built upon a block device 370, which in turn is built upon a LUN 180X, i.e., one of the LUNs 180 in block storage 170. The LUN 180X is a "thin" LUN, meaning that there is no guarantee that space will be available to increase its size beyond its current size. A thin LUN may grow up to a maximums size or until space runs out, but space may run out quickly, depending on other demands placed upon block storage 170.

A file system manager 1702 manages a lifecycle of the file system 1710 (e.g., its creation, operation, and removal) and orchestrates various operations that involve the file system 1710, such as provisioning, de-provisioning, allocation, and free-space scavenging. In an example, the file system manager 1702, file system 1710, local volume 360, and block device 370 all run within an operating system environment in memory of the computerized apparatus, such as in the operating system 330 within the memory 320 of a NAS data node 140b. In a particular example, the file system manager 1702, file system 1710, and local volume 360 run within userspace (e.g., 330a) and the block device 370 runs within kernel space (e.g., 330b). One should appreciate that operating system may support multiple userspace instances, e.g., using container technology (FIG. 5). Also, the entire operating system, including both userspace and kernel space, may run within a virtual machine (FIG. 4).

In an example, the operating system 330 is a version of Linux and the block device 370 is a Linux block device. The Linux kernel expresses the Linux block device as a file that is mapped to an underlying storage device (e.g., to LUN 180X). The file system manager 1702 operating in userspace 330a accesses the block device 370 in the kernel 330b, e.g., using LIBAIO and/or other tools or drivers, and creates the local volume 360 built upon the Linux block device. The file system manager 1702 then deploys the file system 1710 on the local volume 360.

One should appreciate that the file system 1710, local volume 360, and block device 370 are logical structures defined within memory of the computerized apparatus. Each of these logical structures has its own software objects, data structures, metadata, and processing routines associated therewith. In an example, the contents of the file system 1710, including both its data and metadata, are persistently stored in the block storage 170, i.e., in the storage drives 174 that back the LUN 180X.

When operating within the NAS cluster 130, the block device 370 has a device ID, which is unique across the cluster and does not change, even as the NAS server 150 that contains the file system upon which the block device is built moves from one NAS data node 140*b* to another. Thus, if the file system 1710 is deployed on a data node consequent to failover or load balancing, the NAS cluster 130 ensures that the block device 360 assumes the same device ID that supported the file system on the previous data node.

As further shown, the file system 1710 has an address space 350, which ranges, for example, from zero to some large number. The address space 350 is denominated in blocks, where a "block" is the smallest unit of space that the file system manager 1702 can allocate. Block sizes are typically uniform in size, with common sizes being 4 KB or 8 KB, for example. The file system 1710 also has a maximum size 1716, which may be established, for example, when the file system 1710 is first created. To provide a sense of scale, a maximum size 1716 of 64 TB (Terabytes) and a block size of 8 KB (Kilobytes) implies an address range from 0 to 8 billion.

As further shown, the local volume 360 has an address space 1750, the block device 370 has an address space 1760, and the LUN 180X has an address space 1770. In an example, the address spaces 350, 1750, 1760, and 1770 all have the same size and have one-to-one address correspondences with one another. For example, each address 350*a* in the address space 350 of the file system 1710 corresponds, one-to-one, with a respective address 1750*a* in the address space 1750 of the local volume 360, with a respective address 1760*a* in the address space 1760 of the block device 370, and with a respective address 1770*a* in the address space 1770 of the LUN 180X. Owing to this address correspondence, the LUN 180X can also be said to have a maximum size 1776, which is based on the maximum size 1716 of the file system 1710. For example, if the maximum size 1716 of the file system 1710 is 64 TB, the maximum size 1776 of the LUN 180X is also 64 TB.

The file system 1710, local volume 360, block device 370, and LUN 180X are all shown to be smaller than the maximum size 1716. One should appreciate that the file system 1710 may have a current size (as shown), which is smaller than the maximum size, and that this current size may be reflected all the way down the structure.

As further shown in FIG. 17, the file system 1710 may include multiple subspaces, such as the following:

Inode Subspace 1710*a*. A region of contiguous address space (or multiple such regions) reserved for storing inodes (index nodes), which provide per-file metadata of the file system 1710.

IB/Dir 1710*b*. A region of contiguous address space (or multiple such regions) reserved for storing indirect blocks and directories. Indirect blocks include arrays of pointers for mapping inodes to data blocks, which store file data. Directories organize files (inodes) into hierarchical structures.

Shadow Subspace 1710*c*. A region of contiguous address space (or multiple such regions) reserved for storing per-block metadata (metadata for individual blocks) and allocation bitmaps 1712. The allocation bitmaps 1712 provide tracking metadata for maintaining a record of whether blocks are allocated or free and whether they are "provisioned free blocks," i.e., blocks that were previously written to but are now free.

Data Subspace 1710*d*. A region of contiguous address space (or multiple such regions) reserved for storing file data. In an example, each block in the data subspace 1710*d* (i.e., each "data block") has associated per-block metadata in the shadow subspace 1710*c* and may be tracked by allocation bitmaps 1712 in the shadow subspace 1710*c*.

Each of the inode, IB/Dir, and shadow subspaces may be referred to herein as a "metadata subspace."

FIG. 17 shows additional structural features of the file system 1710 (top-right). Here, the file system 1710 is seen to include multiple contiguous extents 1720, where each extent is composed of multiple blocks 1730. An "extent," which may also be referred to herein as a "slice," is a range of contiguous address space. Analogous to the way a block may be the smallest unit of storage space that the file system manager 1702 can allocate, an extent is the smallest unit of storage space that the file system manager 1702 can provision. As is known, "provisioning" is a process for adding storage space to a data object, whereas "allocating" is a process for earmarking already-provisioned storage to particular files or file system structures.

An extent is generally at least 50 MB in size and is typically 256 MB or 1 GB, and extent size is generally uniform across the file system 1710. With the arrangement shown, the current size of the file system 1710 can grow, e.g., up to its maximum size 1716, in discrete units of extents.

Figure 18:
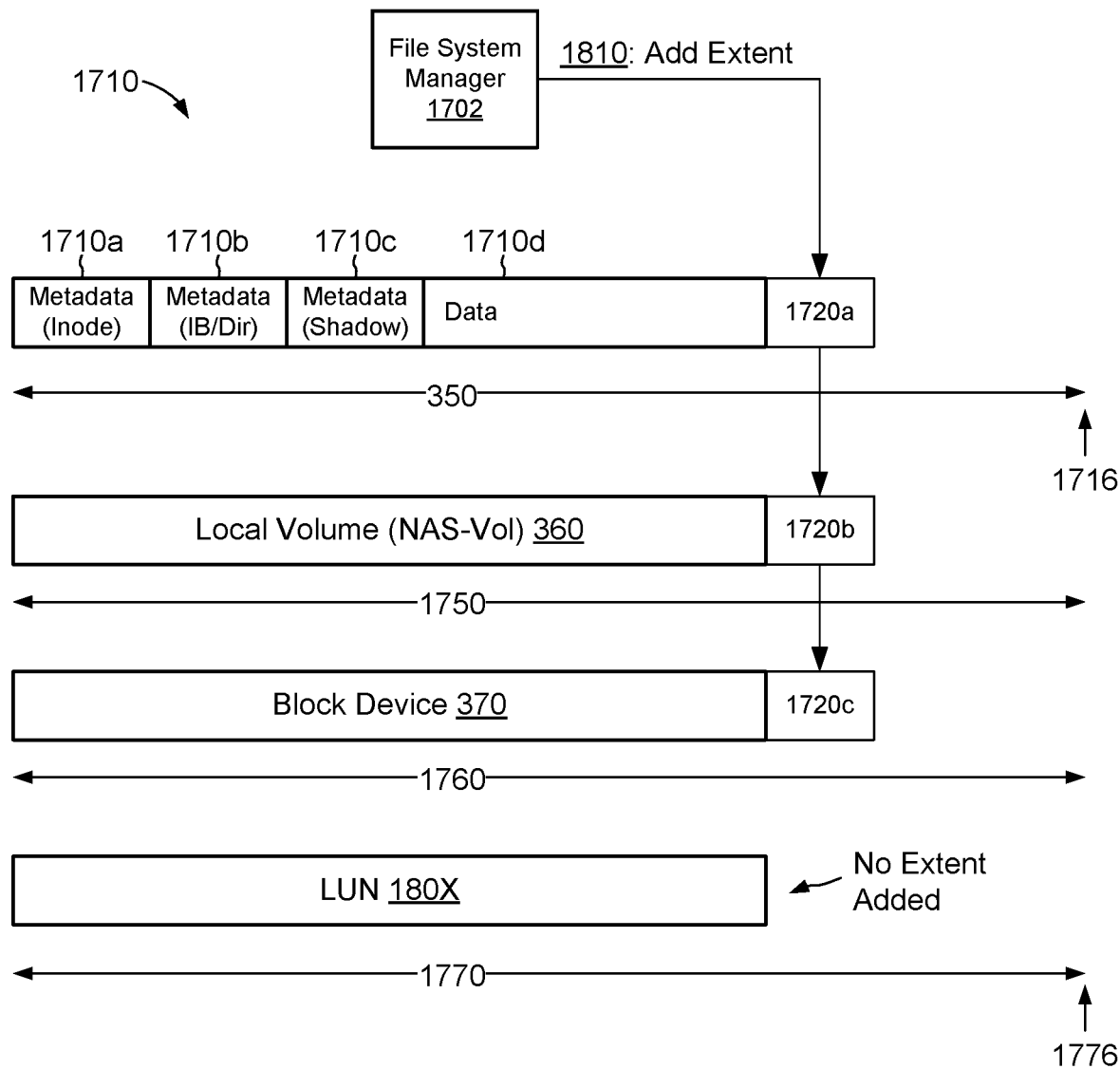
FIG. 18 is a block diagram showing an example procedure for adding an extent of storage to the file system in the arrangement of FIG. 17.

FIG. 18 shows an example arrangement for adding an extent 1720*a* to the file system 1710. Here, file system manager 1702 issues a request 1810 to add an extent to file system 1710. In response, the file system manager 1702 orchestrates a provisioning operation to (i) extend the block device 370 by one extent 1720*c*, (ii) extend the local volume 360 by one extent 1720*b*, and (ii) extend the file system 1710 by one extent 1720*a*. As the block device 370, local volume 360, and file system 1710 are all logical structures, extending these structures by one extent each may be a simple matter of moving an end-of-object pointer for each object one extent forward in the respective object. Once extended, each object is available to be written in the respective, extended area. The file system manager 1702 may perform initial writes to the new extent 1720*a* as part of a formatting procedure.

One should appreciate that the file system manager 1702 may add extents 1720*a*, 1720*b*, and 1720*c* to the respective structures in any order. The particular sequence of adding extents is not critical.

Significantly, the provisioning operation completes without extending provisioned space in the LUN 180X. Rather, the LUN 180X is unaffected by the provisioning operation. No request is made for additional space in the LUN 180X, and no reservation is made to ensure that the space is available from the block storage 170. Rather, the provisioning operation proceeds in a unilateral fashion, arranging the local structures (file system 1710, local volume 360, and block device 370) to reflect the newly added extent without coordinating with the block storage 170.

This unilateral process for provisioning an extent provides benefits in terms of simplicity and avoidance of any need for close coordination with the block storage 170. Rather than performing complex activities of requesting storage space from the block storage 170, reserving space, waiting for responses, and possibly having to coordinate further depending on responses, the provisioning operation simply assumes that the storage space is available from the block storage 170 and proceeds as if it is. The unilateral approach provides the further benefit of being readily extendible to a variety of different block storage technologies, such as block-based arrays (various makes and models), VSAN, software defined storage, and cloud-based storage. Rather than having to develop and support provisioning protocols and procedures for every potential block storage solution, the unilateral approach requires little to no customization. To the contrary, interactions with block storage are highly generalized. The unilateral approach may also help to avoid bottlenecks in a clustered environment where many data nodes access shared block storage. As data nodes may number in the hundreds, supporting highly-interactive provisioning would place high burdens on block-storage processors and networks. Unilateral provisioning avoids these bottlenecks. Of course, unilateral provisioning carries a risk of write failures, as the block storage 170 may be unable to supply storage space needed to support new writes.

Figure 19:
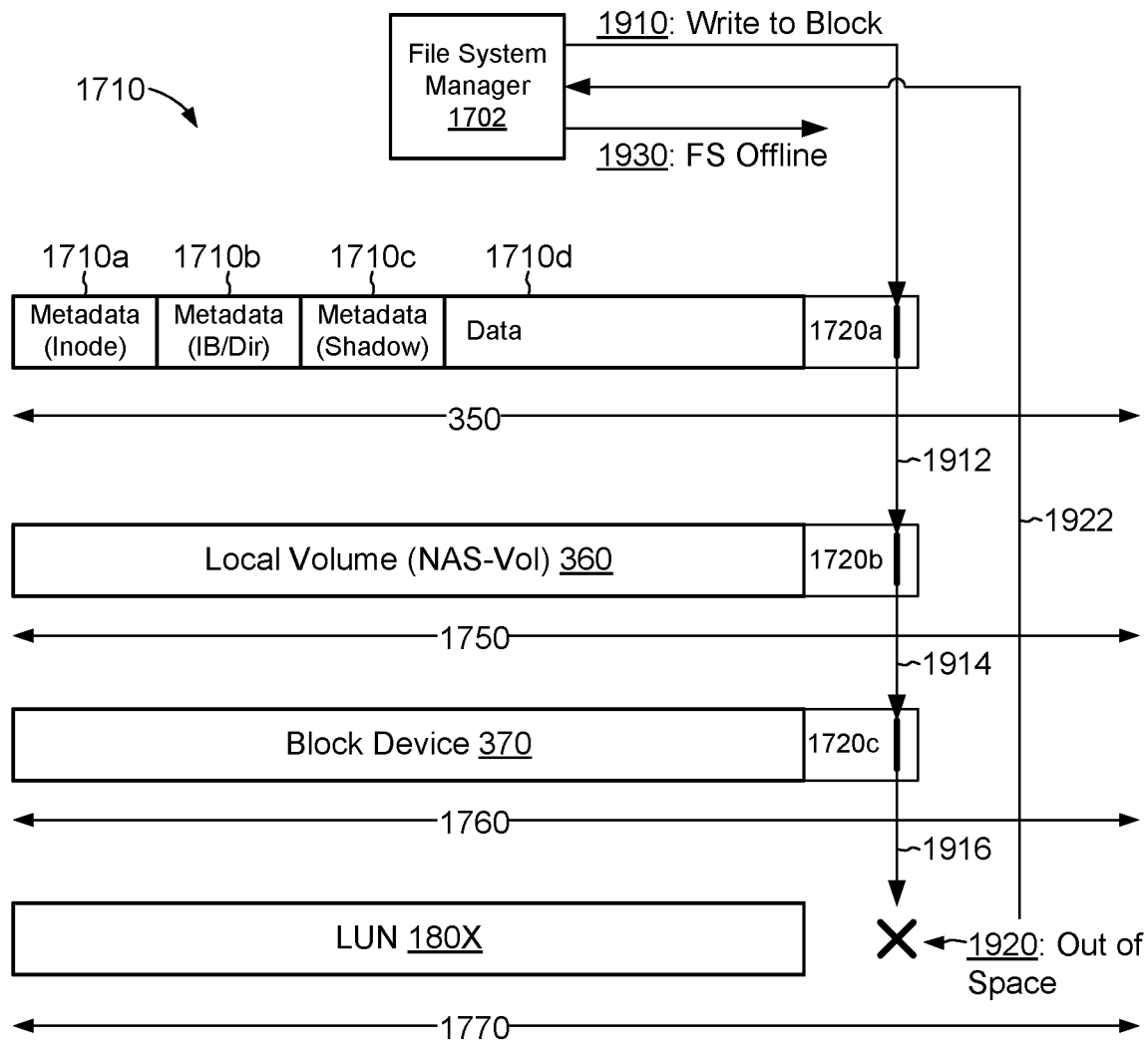
FIG. 19 is a block diagram showing an example wherein writing to a file system location in the file system of FIG. 17 results in an out-of-space condition.

FIG. 19 shows an example of a write failure that can occur if additional space in the block storage 170 is unavailable. Here, the file system manager 1702 issues a write 1910 to a particular address in the file system 1710, which address falls within a region of the added extent 1720a. The write 1910 may be consequent to an I/O request 112 or may be part of a formatting operation. In an example, the write request propagates to the file system level (via 1910), then to the local volume level (via 1912), then to the block device level (via 1914) and then to the LUN 180X (via 1916). However, upon arriving at the LUN 180X, the write request 1916 encounters and out-of-space condition 1920, as the block storage 170 has no space available to support the new write. In response to the out-of-space condition 1920, the block storage 170 sends a message 1922 back to the file system manager 1702, informing the file system manager 1702 of the out-of-space condition 1920. The file system manager 1702 then takes appropriate action, such as taking the file system 1710 offline (via request 1930). Alternatively, other remedial measures may be invoked.

Although out-of-space conditions are not ideal, they may also be rare. This may be especially the case in NAS clusters that include large numbers of nodes, each with many NAS servers 150 (FIG. 1) running many user file systems and potentially supporting many tenants. Such large numbers may tend to produce fairly stable and predictable storage demands, such that any sudden increase in storage requirements by one user would represent a very small percentage change overall. As data nodes generally have shared access to block storage 170, which may be enormous, the chances of any LUN running out of space are extremely low. The size of the NAS cluster 130 thus helps to ensure that out-of-space conditions are rare and provides a solid basis for the unilateral provisioning technique described herein.

Figure 20:
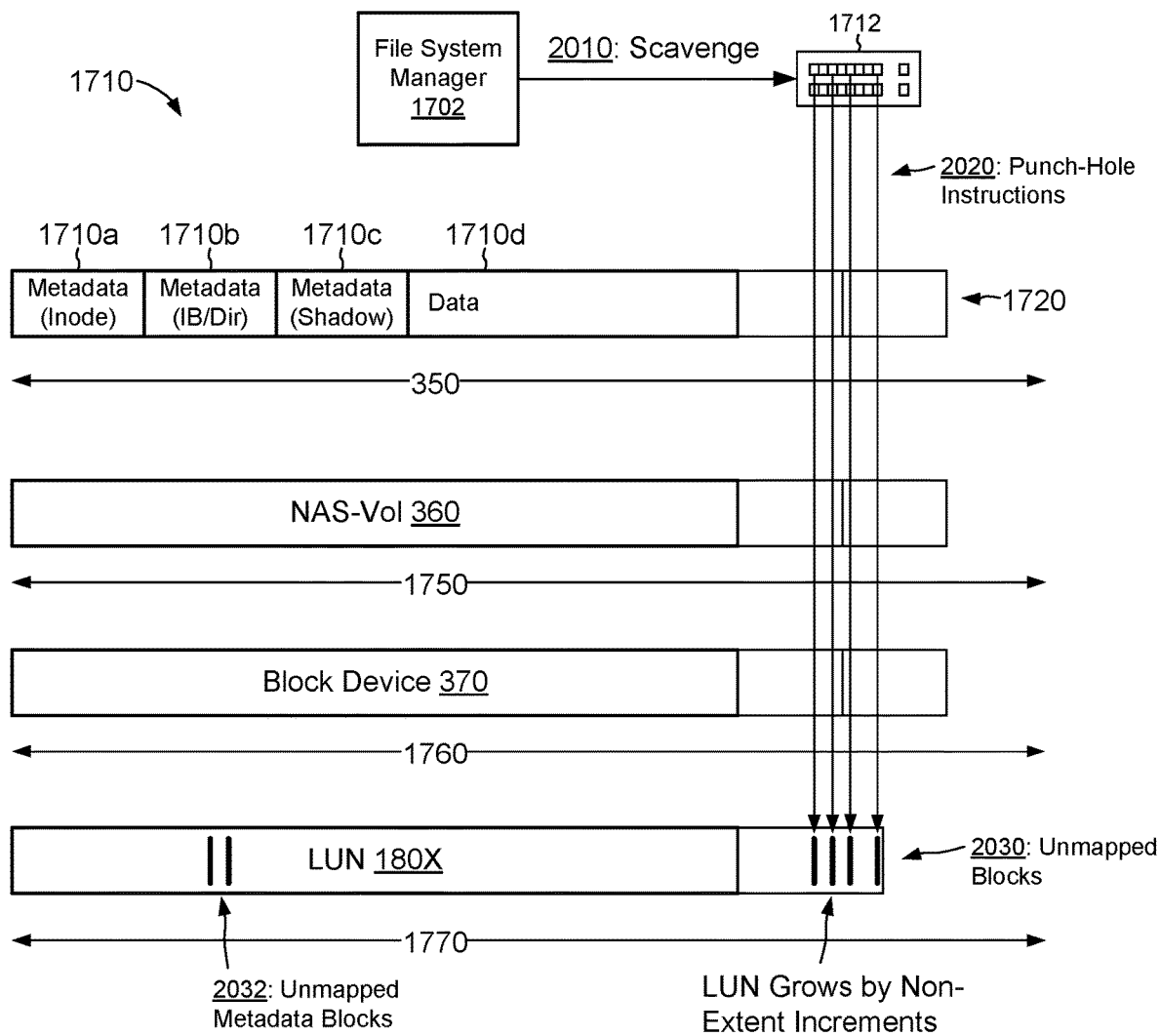
FIG. 20 is a block diagram showing an example scavenging operation performed on the file system of FIG. 17.

FIG. 20 shows an example scavenging operation, which may be performed in connection with the file system 1710. For purposes of FIG. 20, it is assumed that some extents 1720 have been added to the file system 1710 and that no out-of-space condition has occurred. Rather, the LUN 180X has grown as needed to support writes from the file system 1710.

In an example, the LUN 180X has grown by increments, but the increments are not extent-based. Rather, when the LUN 180X requires more space to accommodate write requests, the LUN 180X may grow in increments determined by the block storage 170, e.g., by the particular block-based array or other storage technology providing the LUN 180X. Such increments may correspond to single blocks, to groups of blocks, or to other increments of storage determined and controlled by the block storage 170. Such increments may be the same size as extents 1720, but that would be merely a coincidence, the point being that the LUN 180X grows by increments controlled by the block storage 170, whereas the file system 1710 grows by increments controlled by the file system manager 1702.

To reduce reliance on close coordination with the block storage 170, the file system 1710 preferably does not support conventional file system shrink operations. As is known, conventional file system shrink involves moving data at addresses beyond a target end-of-object to addresses within the target end-of-object and then truncating the file system at the target end-of-object. File system 1710 preferably does not support such shrink operations, as they would require considerable coordination with block storage 170. However, the file system 1710 does preferably support storage reclaim on a per-block basis.

For example, file system manager 1702 issues a request 2010 to perform a scavenging operation on the file system 1710. In response, the scavenging operation accesses allocation bitmaps 1712 and identifies provisioned free blocks (i.e., blocks that have previously been written-to but are now free) in the data subspace 1710d. When the scavenging operation identifies a provisioned free block at a particular file system address, the scavenging operation issues a punch-hole instruction to the identified address. Punch-hole instructions are also referred to in the art as "unsnap" instructions. Several punch-hole instructions 2020 are shown. Each punch-hole instruction propagates to lower levels and frees structures in corresponding addresses at those levels. When a punch-hole instruction reaches LUN 180X, the punch-hole instruction frees the block in LUN 180X at the corresponding address, i.e., at the address in LUN 180X that corresponds to the file system address to which the punch-hole instruction was directed. As a result of the punch-hole instructions 2020, the LUN 180X is left with corresponding unmapped blocks 2030. The block storage 170 is then free to use those unmapped blocks 2030 for other purposes, e.g., to support other LUNs 180.

One should appreciate that the block storage 170 may employ features for managing its own storage, such as block virtualization, block allocation, internal provisioning, storage reorganization, and so forth, which may enable the block storage 170 to readily de-allocate blocks from one LUN 180 and allocate them to another. Such operations would be internal to the block storage 170 and would preferably require no communication with any data node.

In some examples, the file system manager 1702 keeps track of metadata in any of the metadata subspaces 1710a, 1710b, and 1710c, which support data blocks in the data subspace 1710d that have been subjected to the punch-hole instructions 2020. The file system manager 1702 may then direct punch-hole instructions to those metadata blocks (assuming they do not also support blocks that have not been hole-punched). These punch-hole instructions to metadata propagate to the LUN 180X, where they result in unmapped metadata blocks 2032.

As previously described, the file system 1710 may manage its address space 350 in extent-based increments. The file system 1710 may thus simplify its own activities by entirely removing extents 1720 once they become empty.

Figure 21:
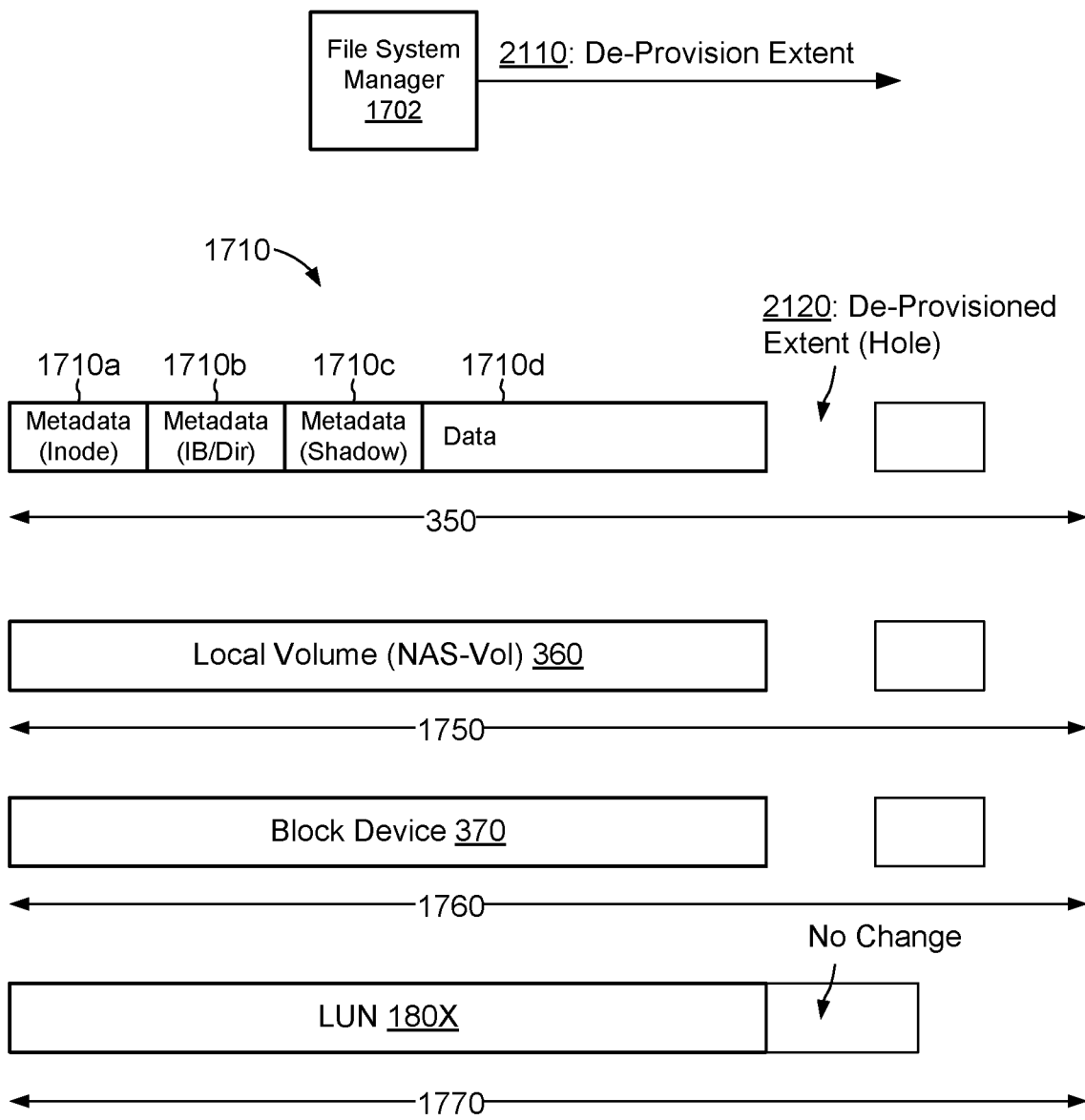
FIG. 21 is a block diagram showing an example de-provisioning operation performed on the file system of FIG. 17.

FIG. 21 shows an example in which an extent 1720 is de-provisioned from the file system 1710. Here, the file system manager 1702 detects that all block locations in a particular extent 1720 have been hole-punched, e.g., consequent to a large delete operation. In response to such detection, the file system manager 1702 issues a de-provisioning request 2110, whereupon the file system manager 1702 logically removes the hole-punched extent entirely from an active region of the file system 1710. The portion of the address space supporting the removed extent may still be present, but the file system's internal accounting treats that portion as a hole 2120. The hole 2120 may also be reflected in the local volume 360 and in the block device 370, but not in the LUN 180X, which manages its own space.

The file system manager 1702 may de-provision extents from the metadata subspaces as well as from the data subspaces. Thus, extents in any of the metadata subspaces, which become completely hole-punched, may be de-provisioned from the file system 1710, again with no consequence to the LUN 180X.

De-provisioning of extents 1720 simplifies internal file system operations by reducing the number of extents 1720 that the file system manager 1702 is required to manage, with simplifications likewise benefiting management of the local volume 360 and block device 370, but preferably with no effect on management of the LUN 180X.

Figure 22:
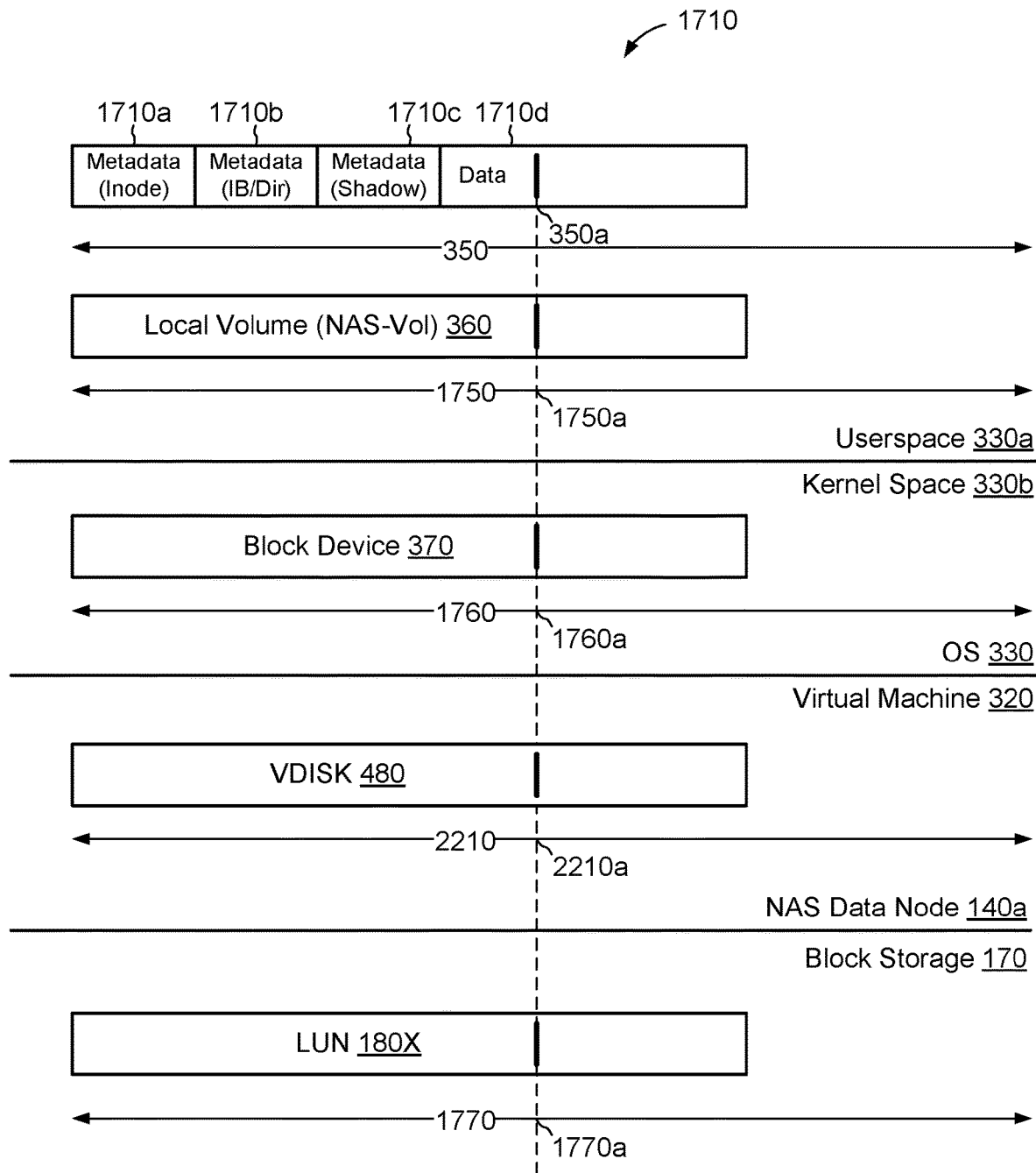
FIG. 22 is a block diagram showing another example arrangement of structures for realizing a file system.

FIG. 22 shows a variant on the stack-up of structures supporting file system 1710. The example of FIG. 22 assumes a virtual machine implementation, such as the one shown in FIG. 4, in which the block device 370 accesses the LUN 180X via a vdisk (virtual disk) 480. In an example, a data node 140b is configured as a vSphere ESX host running a virtual machine, which contains the operating system (e.g., Linux) in which the file system 1710 is deployed. According to this variant, LUN 180X is provisioned to the ESX host (e.g., under direction of the cluster manager 160 coordinating with the block storage 170), which creates the vdisk 480 and presents it to the virtual machine. The operating system running within the virtual machine discovers the vdisk and renders it as block device 370, upon which the local volume 360 and file system 1710 are constructed, in the manner described above. In an example, the vdisk 480 has an address space 2210, in which each address 2210a corresponds one-to-one with a corresponding address in each of the address spaces 350, 1750, 1760, and 1770.

Figure 23:
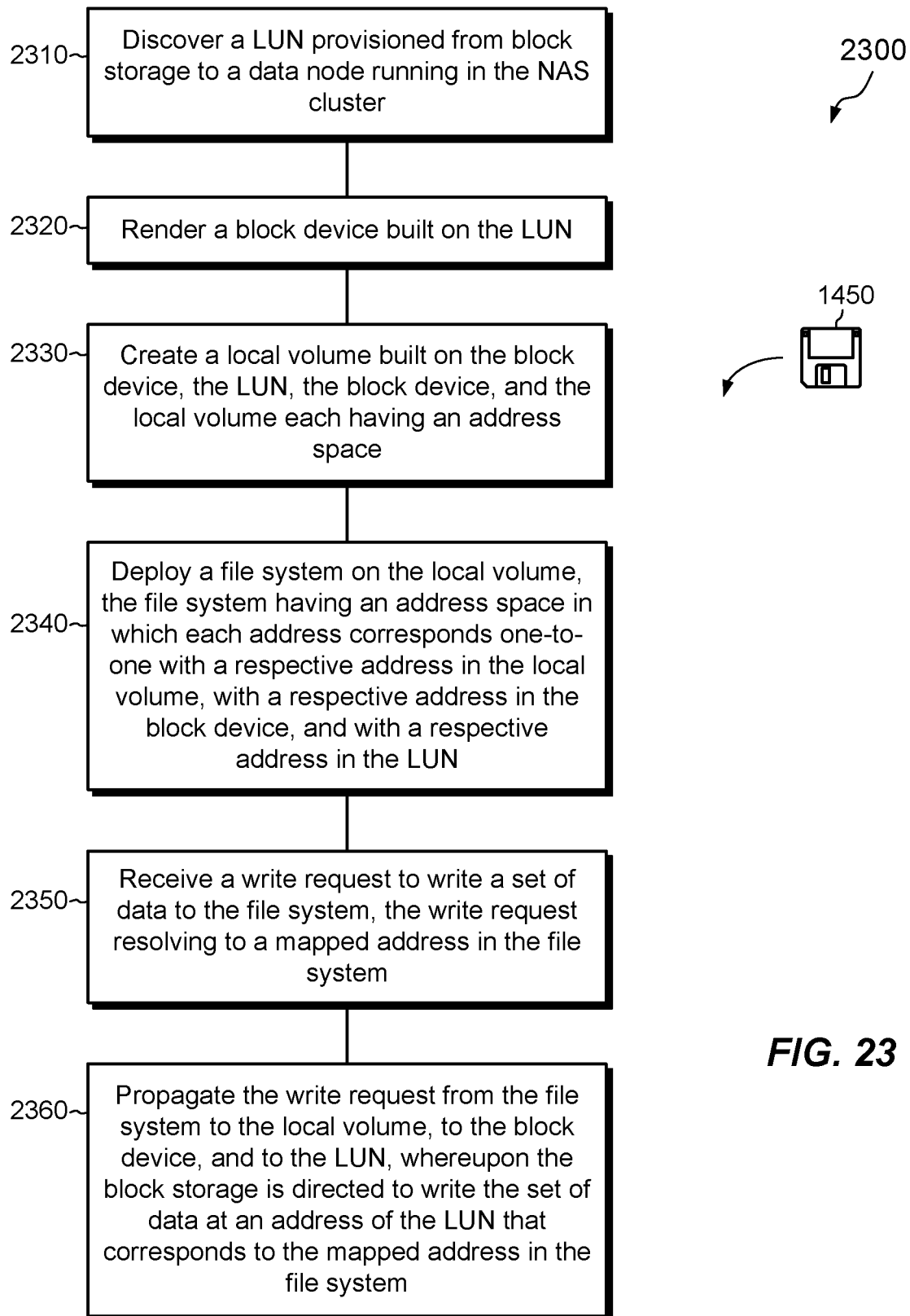
FIGS. 23 and 24 are flowcharts showing example methods for operating a file system.
Figure 24:
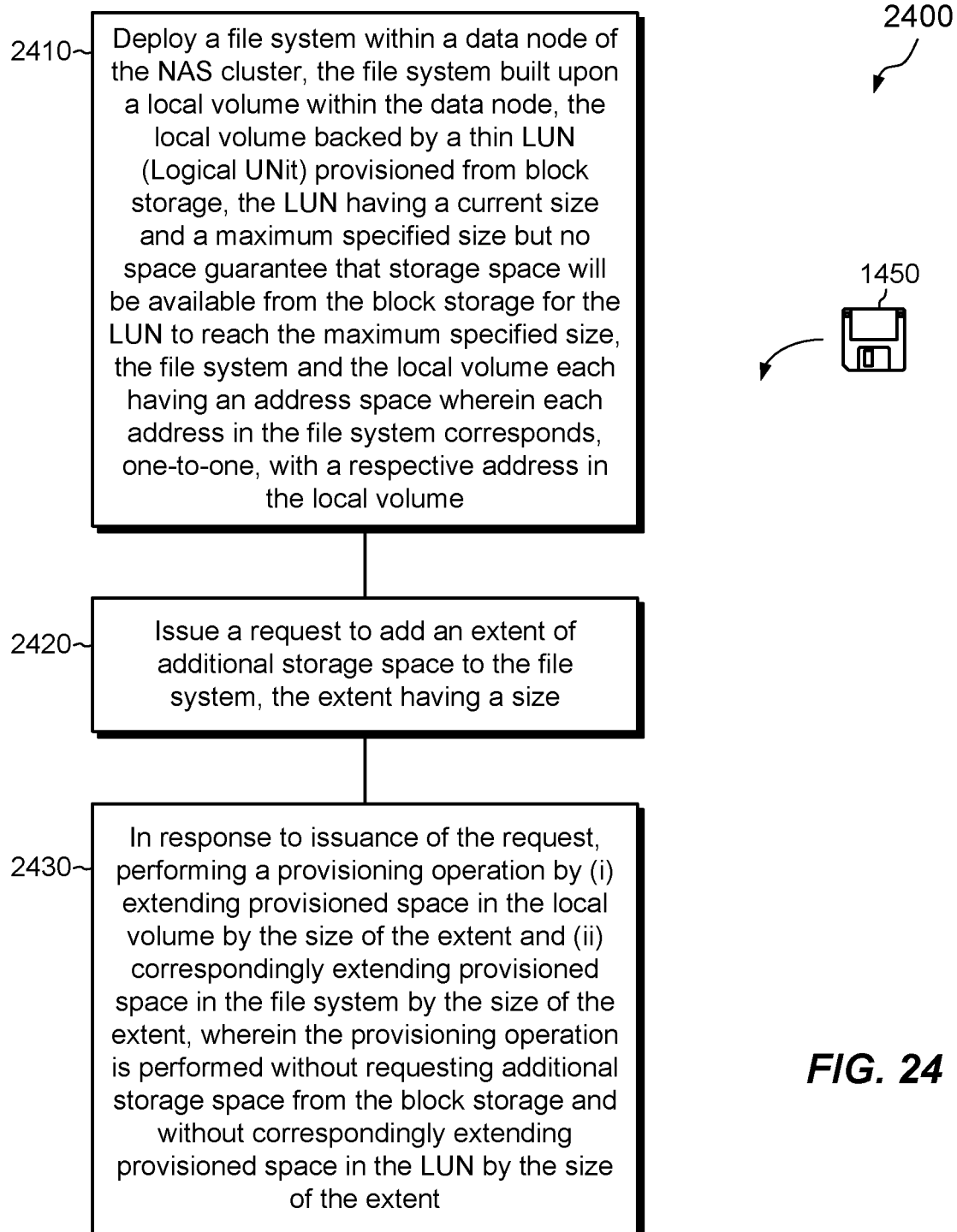

FIGS. 23 and 24 show example methods 2300 and 2400 that may be carried out by a computerized apparatus, such as by a data node 140a running in a NAS cluster 130. The methods 2300 and 2400 may be performed by the software constructs described in connection with any of FIGS. 3-5, which reside in the memory 320 and are run by the set of processing units 312. The recited acts of methods 2300 and 240 may be performed in any suitable order, which may include performing some acts simultaneously.

FIG. 23 shows a method 2300 for operating a file system. At 2310, the data node discovers a LUN provisioned from block storage to a data node. For example, the cluster manager 160 directs the block storage 170 to provision LUN 180X to a data node 140a. The operating system 330 running on the data node 140a discovers the LUN 180X.

At 2320, the LUN is rendered as a block device. For example, the kernel 330b of operating system 330 renders the LUN 180X as a block device 370, such as a Linux block device.

At 2330, a local volume is built on the block device. For example, the file system manager 1702, which runs in userspace 330a, directs the operating system 330 to construct the local volume 360 in userspace 330a over the block device 370 running in kernel space 330b. The LUN 180X, the block device 370, and the local volume 360 each have a respective address space (e.g., address spaces 1770, 1760, and 1750).

At 2340, a file system 1710 is deployed on the local volume 360. The file system 1710 has an address space 350 in which each address corresponds one-to-one with a respective address in the local volume 360, with a respective address in the block device 370, and with a respective address in the LUN 180X.

At 2350, a write request is received to write a set of data to the file system 1710. The write request resolves to a mapped address in the file system. For example, the data node may receive an I/O request 112 from a host device 110 requesting that data be written to a particular file in a file system hosted by the data node. The file system manager 1702 maps the write request to a particular address in the file system 1710, such as to address 350a (FIG. 17).

At 2360, the write request propagates from the file system 1710 to the local volume 360, to the block device 370, and to the LUN 180X, whereupon the block storage 170 is directed to write the set of data at an address 1770a of the LUN 180X that corresponds to the mapped address 350a in the file system 1710.

FIG. 24 shows a method 2400 for operating a file system. At 2410, a file system 1710 is deployed within a data node 140a of the NAS cluster 130. The file system 1710 is built upon a local volume 360 within the data node 140a. The local volume 360 is backed by a thin LUN (Logical UNit) 180X provisioned from block storage 170. The LUN 180X has a current size and a maximum specified size 1776 but no space guarantee that storage space will be available from the block storage 170 for the LUN 180X to reach the maximum specified size 1776. The file system 1710 and the local volume 360 each have an address space (350 and 1750, respectively), wherein each address (e.g., 350a) in the file system 1710 corresponds, one-to-one, with a respective address (e.g., 1750a) in the local volume 360.

At 2420, a request is issued to add an extent 1720 of additional storage space to the file system 1710, the extent having a size (e.g., 256 MB, 1 GB, etc.).

At 2430, in response to issuance of the request, a provisioning operation is performed by (i) extending provisioned space in the local volume 360 by the size of the extent and (ii) correspondingly extending provisioned space in the file system 1710 by the size of the extent, wherein the provisioning operation is performed without requesting additional storage space from the block storage 170 and without correspondingly extending provisioned space in the LUN 180X by the size of the extent.

Techniques have been described for operating a file system in a NAS cluster 130. The techniques simplify communications with block storage 170 by deploying a file system 1710 on a thin LUN 180X in block storage and provisioning storage space to the file system 1710 without provisioning equal space to the LUN 180X. Rather, the file system 1710 proceeds unilaterally as if the storage space is available to the LUN 180X without provisioning the space or confirming availability.

Further techniques have been disclosed for operating a file system 1710 in a NAS cluster 130. Such techniques include discovering, by a data node 140a running in the NAS cluster 130, a LUN (Logical UNit) 180X provisioned from block storage 170, rendering the LUN 180X as a block device 370, and creating a local volume 360, built on the block device 370. The data node 140a then deploys the file system 1710 on the local volume 360. These techniques may be used separately or together in any manner.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment may be included with any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 1450 in FIGS. 14-16, 23 and 24). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of operating a file system, the method comprising:
    discovering, by a data node running in a NAS (network attached storage) cluster, a LUN (Logical UNit) provisioned from block storage to the data node;
    rendering a block device built on the LUN, the block device being a file that resides on the data node and is mapped to the LUN discovered by the data node;
    creating a local volume built on the block device as a separate structure from the block device, the LUN, the block device, and the local volume each having an address space;
    deploying a file system on the local volume, the file system having an address space in which each address corresponds one-to-one with a respective address in the local volume, with a respective address in the block device, and with a respective address in the LUN;
    receiving a write request to write a set of data to the file system, the write request resolving to a mapped address in the file system; and
    propagating the write request from the file system to the local volume, to the block device, and to the LUN, whereupon the block storage is directed to write the set of data at an address of the LUN that corresponds to the mapped address in the file system,
    wherein rendering the block device based on the LUN includes realizing the block device in a kernel of an operating system running on the data node,
    wherein creating the local volume built on the block device includes realizing the local volume in userspace of the operating system,
    wherein the operating system runs in a virtual machine running within a virtual machine environment on the data node, wherein provisioning the LUN from the block storage to the data node effects provisioning of the LUN to the virtual machine server, and wherein the method further comprises:
        the virtual machine environment expressing the LUN as a vdisk (virtual disk);
        the virtual machine environment presenting the vdisk to the virtual machine; and
        the operating system discovering the vdisk presented to the virtual machine,
    wherein rendering the block device built on the LUN includes expressing the discovered vdisk as the block device.

2. The method of claim 1, wherein the file system has a maximum specified size that is established when the file system is created and that does not change over a lifecycle of the file system.

3. The method of claim 2, wherein the LUN is a thin LUN having an initial size and a maximum allowable size, the maximum allowable size based on the maximum specified size of the file system, the LUN having no space guarantee that storage space will be available from the block storage for enabling the LUN to reach the maximum allowable size.

4. The method of claim 3, wherein the LUN is an only LUN that backs the file system, such that all of the contents of the file system are stored in the LUN.

5. The method of claim 1, wherein the vdisk has an address space, and wherein each address of the file system corresponds one-to-one with a respective address in the address space of the vdisk.

6. The method of claim 1, wherein the local volume, the block device, and the LUN each have a respective address space, and wherein the address space of the file system, the address space of the local volume, the address space of the block device, and the address space of the LUN are all the same size.

7. The method of claim 1, wherein creating the local volume built on the block device is performed under control of a file system manager running on the data node.

8. A computerized apparatus, comprising a set of processing units coupled to memory, the set of processing units and the memory together forming control circuitry, the control circuitry constructed and arranged to:
    discover, by a data node running in a NAS (network attached storage) cluster, a LUN (Logical UNit) provisioned from block storage to the data node;
    render a block device built on the LUN, the block device being a file that resides on the data node and is mapped to the LUN discovered by the data node;
    create a local volume built on the block device as a separate structure from the block device, the LUN, the block device, and the local volume each having an address space;
    deploying a file system on the local volume, the file system having an address space in which each address corresponds one-to-one with a respective address in the local volume, with a respective address in the block device, and with a respective address in the LUN;

receive a write request to write a set of data to the file system, the write request resolving to a mapped address in the file system; and propagate the write request from the file system to the local volume, to the block device, and to the LUN, whereupon the block storage is directed to write the set of data at an address of the LUN that corresponds to the mapped address in the file system, wherein the control circuitry constructed and arranged to render the block device based on the LUN is further constructed and arranged to realize the block device in a kernel of an operating system running on the data node, wherein the control circuitry constructed and arranged to create the local volume built on the block device is further constructed and arranged to realize the local volume in userspace of the operating system, wherein the control circuitry is constructed and arranged to run the operating system in a virtual machine within a virtual machine environment on the data node, wherein the control circuitry constructed and arranged to provision the LUN from the block storage to the data node is further constructed and arranged to effect provisioning of the LUN to the virtual machine server, and wherein the control circuitry is further constructed and arranged to:
 express, by the virtual machine environment, the LUN as a vdisk (virtual disk);
 present, by the virtual machine environment, the vdisk to the virtual machine; and
 discover, by the operating system, the vdisk presented to the virtual machine, wherein the control circuitry constructed and arranged to render the block device built on the LUN is further constructed and arranged to express the discovered vdisk as the block device.

9. The computerized apparatus of claim 8, wherein the vdisk has an address space, and wherein each address of the file system corresponds one-to-one with a respective address in the address space of the vdisk.

10. A computer program product including a set of non-transitory, computer-readable media having instructions which, when executed by control circuitry of a computerized apparatus, cause the control circuitry to perform a method for operating a file system, the method comprising:
 discovering, by a data node running in a NAS (network attached storage) cluster, a LUN (Logical UNit) provisioned from block storage to the data node;
 rendering a block device built on the LUN, the block device being a file that resides on the data node and is mapped to the LUN discovered by the data node;
 creating a local volume built on the block device as a separate structure from the block device, the LUN, the block device, and the local volume each having an address space;

deploying a file system on the local volume, the file system having an address space in which each address corresponds one-to-one with a respective address in the local volume, with a respective address in the block device, and with a respective address in the LUN;

receiving a write request to write a set of data to the file system, the write request resolving to a mapped address in the file system; and propagating the write request from the file system to the local volume, to the block device, and to the LUN, whereupon the block storage is directed to write the set of data at an address of the LUN that corresponds to the mapped address in the file system, wherein rendering the block device based on the LUN includes realizing the block device in a kernel of an operating system running on the data node, wherein creating the local volume built on the block device includes realizing the local volume in userspace of the operating system, wherein the operating system runs in a virtual machine running within a virtual machine environment on the data node, wherein provisioning the LUN from the block storage to the data node effects provisioning of the LUN to the virtual machine server, and wherein the method further comprises:
 the virtual machine environment expressing the LUN as a vdisk (virtual disk);
 the virtual machine environment and presenting the vdisk to the virtual machine; and
 the operating system discovering the vdisk presented to the virtual machine, wherein rendering the block device built on the LUN includes expressing the discovered vdisk as the block device.

11. The computer program product of claim 10, wherein the file system has a maximum specified size that is established when the file system is created and that does not change over a lifecycle of the file system.

12. The computer program product of claim 11, wherein the LUN is a thin LUN having an initial size and a maximum allowable size, the maximum allowable size based on the maximum specified size of the file system, the LUN having no space guarantee that storage space will be available from the block storage for enabling the LUN to reach the maximum allowable size.

13. The computer program product of claim 12, wherein the LUN is an only LUN that backs the file system, such that all of the contents of the file system are stored in the LUN.

14. The computer program product of claim 10, wherein the vdisk has an address space, and wherein each address of the file system corresponds one-to-one with a respective address in the address space of the vdisk.

\* \* \* \* \*